US008545791B2

(12) United States Patent
Plata et al.

(10) Patent No.: US 8,545,791 B2
(45) Date of Patent: Oct. 1, 2013

(54) ALKYNE-ASSISTED NANOSTRUCTURE GROWTH

(75) Inventors: Desiree L. Plata, Holyoke, MA (US); Philip S. Gschwend, Lexington, MA (US); Anastasios John Hart, Ann Arbor, MI (US); Eric R. Meshot, Ann Arbor, MI (US); Christopher M. Reddy, Falmouth, MA (US)

(73) Assignees: Massachusetts Institute of Technology, Cambridge, MA (US); University of Michigan, The Board of Regents Acting For and On Behalf of the C/O Technology Management Office, Ann Arbor, MI (US); Woods Hole Oceanographic Institute, Woods Hole, MA (US)

(*) Notice: Subject to any disclaimer, the term of this patent is extended or adjusted under 35 U.S.C. 154(b) by 0 days.

(21) Appl. No.: 12/817,818

(22) Filed: Jun. 17, 2010

(65) Prior Publication Data
US 2011/0038784 A1     Feb. 17, 2011

Related U.S. Application Data

(60) Provisional application No. 61/187,704, filed on Jun. 17, 2009.

(51) Int. Cl.
*D01C 5/00* (2006.01)
(52) U.S. Cl.
USPC .................... 423/447.3; 977/742; 977/842
(58) Field of Classification Search
USPC ........... 423/447.1, 445 B, DIG. 40; 977/742, 977/743, 843
See application file for complete search history.

(56) References Cited

U.S. PATENT DOCUMENTS

| 2005/0089467 A1* | 4/2005 | Grill et al. ................ 423/447.3 |
| 2007/0253890 A1* | 11/2007 | Nakayama et al. ........ 423/447.3 |
| 2008/0182027 A1 | 7/2008 | Vasenkov |

FOREIGN PATENT DOCUMENTS

| EP | 1061041 A1 * | 12/2000 |
| FR | 2909369 | 6/2008 |
| JP | 2004182573 A * | 7/2004 |

OTHER PUBLICATIONS

Son et al. "Synthesis of multi-walled carbon nanotube in a gas-solid fluidized bed" Korean J. Chem. Eng., 23(5), 838-841 (2006).*
Son et al. "High-Quality Multiwalled Carbon Nanotubes from Catalytic Decomposition of Carboneous Materials in Gas-Solid Fluidized Beds" Ind. Eng. Chem. Res. 2008, 47, 2166-2175.*
Hajime Endo, Kazunori Kuwana, Kozo Saito, Dali Qian, Rodney Andrews, Eric A. Grulke, CFD prediction of carbon nanotube production rate in a CVD reactor, Chemical Physics Letters, vol. 387, Issues 4-6, Apr. 1, 2004, pp. 307-311, ISSN 0009-2614, DOI: 10.1016/j.cplett.2004.01.124.*

(Continued)

*Primary Examiner* — Stanley Silverman
*Assistant Examiner* — Richard M Rump
(74) *Attorney, Agent, or Firm* — Wolf, Greenfield & Sacks, P.C.

(57) ABSTRACT

The present invention relates to the formation and processing of nanostructures including nanotubes. Some embodiments provide processes for nanostructure growth using relatively mild conditions (e.g., low temperatures). In some cases, methods of the invention may improve the efficiency (e.g., catalyst efficiency) of nanostructure formation and may reduce the production of undesired byproducts during nanostructure formation, including volatile organic compounds and/or polycylic aromatic hydrocarbons. Such methods can both reduce the costs associated with nanostructure formation, as well as reduce the harmful effects of nanostructure fabrication on environmental and public health and safety.

45 Claims, 14 Drawing Sheets

(56) References Cited

OTHER PUBLICATIONS

International Search Report from International Application No. PCT/US2010/001745 mailed on Feb. 7, 2011, 18 pages.

Meshot et al., "Abrupt self-termination of vertically aligned carbon nanotube growth," Applied Physics Letters vol. 92, No. 11, 2008, p. 113107-1-113107-3.

Lee et al. "Low temperature growth of vertically aligned carbon nanotubes by thermal chemical vapor deposition," Chemical Physics Letters vol. 338, pp. 113-117, Apr. 20, 2001.

Plata et al., "Multiple Alkynes React with Ethylene to Enhance Carbon Nanotube Synthesis, Suggesting a Polymerization-like Formation Mechanism," ACS Nano, Nov. 4, 2010, vol. 4 (12): 7185-7192.

Plata et al., "Early Evaluation of Potential Environmental Impacts of Carbon Nanotube Synthesis by Chemical Vapor Deposition," Environmental Science & Technology, Nov. 21, 2009, vol. 43 (21): 8367-8373.

International Preliminary Report on Patentability from International Application No. PCT/US2010/0071745 mailed on Jan. 5, 2012.

Choi, et al., Polymerization of olefins through heterogeneous catalysis. II. Kinetics of gas phase propylene polymerization with Ziegler-Natta catalysts. J. Appl. Polymer Sci., vol. 30, 1065-1081 (1985).

Eklund, et al., International Assessment of Research and Development on Carbon Nanotubes: Manufacturing and Applications, World Technology Evaluation Center Report, (2008).

Eres, et al., Molecular beam-controlled nucleation and growth of vertically aligned single-wall carbon nanotube arrays. J. Phys. Chem. B., vol. 109, No. 35, 16684-16694 (2005).

Gutowski, et al., Thermodynamic analysis of resources used in manufacturing processes. Environ. Sci. Technol., vol. 43, pp. 1584-1590, (2009).

Han, et al., A mechanochemical model of growth termination in vertical carbon nanotube forests, ACS Nano, vol. 2, No. 1, pp. 53-60 (2008).

Hart, Thesis titled Chemical, Mechanical, and Thermal Control of Substrate-Bound Carbon Nanotube Growth. 2006.

Hart, et al., Desktop growth of carbon nanotube monoliths with in situ optical imaging. Small, vol. 3, No. 5, pp. 772-777 (2007).

Healy, et al., Environmental assessment of single-walled carbon nanotube processes. J. Industrial Ecology, vol. 12, No. 3, pp. 376-393 (2008).

Hofmann, et al.,In situ observations of catalyst dynamics during surface-bound carbon nanotube nucleation. Nano Letters, vol. 7, No. 3, pp. 602-608 (2007).

Jaber, et al., Polymerization of olefins through heterogeneous catalysis. XIV. The influence of temperature in the solution copolymerization of ethylene. J. Appl. Polymer Sci., vol. 50, pp. 201-215 (1993).

Jaber, et al., Polymerization of olefins through heterogeneous catalysis. XV. The influence of pressure in the solution copolymerization of ethylene. J. Appl. Polymer Sci. 1993, 50, 217-231.

Jeganmohan, et al., Cobalt- and nickel-catalyzed regio- and stereoselective reductive coupling of alkynes, allenes, and alkenes with alkenes. Chem. Eur. J., vol. 14, pp. 10876-10886 (2008).

Joosten, et al., Multimetallic zirconocene-based catalysis: Alkyne dimerization and cyclotrimerization reactions. Organometallics, vol. 27, pp. 4152-4157 (2008).

Joselevich, et al., Carbon Nanotube Synthesis and Organization in Carbon Nanotubes, Advanced Topics in the Synthesis, Structure, Properties and Applications; Jorio, A., Dresselhaus, G., Dresselhaus, M.S., Eds. Springer-Verlag: New York, pp. 101-164 (2008).

Kanzow, et al., Formation mechanism of single-wall carbon nanotubes on liquid-metal particles. Phys. Rev. Lett., vol. 60, No. 15, pp. 11180-11186 (1999).

Meshot, et al., Engineering Vertically Aligned Carbon Nantube Growth by Decoupled Thermal Treatment of Precursor and Catalyst, ACS Nano, vol. 3, No. 9 pp. 2477-2486 (2009).

Raty, et al., Growth of carbon nanotubes on metal nanoparticles: A microscopic mechanism from ab initio molecular dynamics simulations. Phys. Rev. Lett., vol. 95, No. 9, pp. 096103-1-096103-4 (2005).

Reilly, et al., The role of free radical condensates in the production of carbon nanotubes during the hydrocarbon CVD process. Carbon, vol. 44, pp. 1653-1660 (2006).

See, et al., A review of carbon nanotube synthesis via fluidized-bed chemical vapor deposition. Ind. Eng. Chem. Res. vol. 46, pp. 997-1012 (2007).

Shi, et al., Alkynes as Stille reaction pseudohalides: Gold- and Palladium-cocatalyzed synthesis of tri-and tetra-substituted olefins. JACS Comm , vol. 130, pp. 2168-2169 (2008).

Stein, et al., A new pathway to benzene in flames. Twenty-third Symposium (International) on Combustion. The Combustion Institute, Pittsburh, 1990, pp. 85-90.

Stein, et al., High-temperature stabilities of hydrocarbons. J. Phys. Chem, vol. 89, No. 17, pp. 3714-3725 (1985).

Sugihara, et al., Advances in the Pauson-Khand reaction: Development of reactive cobalt complexes. Chem. Eur. J., vol. 7, No. 8, 1589-1595 (2001).

Thayer, Carbon nanotubes by the metric ton. Chemical & Engineering News, vol. 85, no. 46, pp. 29-35 (2007).

van Laake, et al., A suspended heated silicon platform for rapid thermal control of surface reactions with application to carbon nanotube synthesis. Review of Scientific Instruments, vol. 78, pp. 083901-1-083901-9 (2007).

Vasenkov, et al., Multiscale modeling catalytic decomposition of hydrocarbons during carbon nanotube formation. J. Phys. Chem. B, vol. 113, No. 7, pp. 1877-1882 (2009).

Xiang, et al, Growth deceleration of vertically aligned carbon nanotube arrays: Catalyst deactivation or feedstock diffusion controlled? J. Phys. Chem. C, vol. 112, pp. 4892-4896 (2008).

Yamada, et al., Revealing the secret of water-assisted carbon nanotube synthesis by microscopic observation of the interaction of water on the catalysts. Nano Letters, vol. 8, No. 12, pp. 4288-4292 (2008).

* cited by examiner

TERMINATION EVENTS: NET H$_2$ ADDITION

ALKYNE-ASSISTED NANOSTRUCTURE GROWTH

RELATED APPLICATIONS

Utility

This application claims priority under 35 U.S.C. §119(e) to co-pending U.S. Provisional Application Ser. No. 61/187,704, filed Jun. 17, 2009, the contents of which are incorporated herein by reference in its entirety.

STATEMENT REGARDING FEDERALLY SPONSORED RESEARCH OR DEVELOPMENT

This invention was made with the support under the following government contract: CMMI0800213 awarded by the National Science Foundation. The government has certain rights in the invention.

FIELD OF THE INVENTION

The present invention relates to nanostructures, and related methods.

BACKGROUND OF THE INVENTION

The industrial and laboratory-scale production of carbon nanotubes (CNTs) has been increasing for the last decade, with current production volumes at 1,300 tons year$^{-1}$ globally (ton=10$^6$ g) (e.g., with a doubling rate of once every two years and assuming that the CNT mass:US $ ratio is unchanged over the next ten years). Many known methods for large-volume CNT production, including catalytic chemical vapor deposition (CVD), are plagued by inefficiency where no more than about 3% of the introduced carbon feedstock is converted to CNT. In some cases, the unused feedstock is recycled for subsequent nanotube growth, but in many other cases, the effluent and its associated by-products are vented to the atmosphere. These untreated materials could amount to an annual release of 41,000 tons (41×10$^9$ g) of carbonaceous material, and this may expand to 1,300,000 tons year$^{-1}$ (1.3× 10$^{12}$ g year$^{-1}$) within the next decade if production accelerates as predicted.

Additionally, for many methods, heating the feedstock gas at high temperatures is necessary for rapid CNT growth in order to generate critical CNT precursor molecules. Recent studies have demonstrated that the effluent from an ethene-based CVD growth, i.e., by thermal treatment of common CNT feedstock gasses ($C_2H_4/H_2$), contained several compounds that pose threats to the quality of the air, water and soil. These include toxics (e.g., benzene, 1,3-butadiene, and aromatic hydrocarbons), greenhouse gases (e.g., methane), and compounds that contribute to smog formation and exacerbate respiratory illness.

SUMMARY OF THE INVENTION

The present invention provides methods for forming carbon nanostructures. In some embodiments, the method comprises contacting a reactant vapor comprising a nanostructure precursor material with a catalyst material to cause formation of nanostructures, wherein the nanostructure precursor material comprises at least one hydrocarbon and the reactant vapor is maintained at a temperature of less than 400° C. prior to contacting the catalyst material.

In some embodiments, the method comprises contacting a reactant vapor comprising a nanostructure precursor material with a catalyst material to cause formation of nanostructures, wherein the reactant vapor is substantially free of an oxygen-containing species or a nitrogen-containing species, and the nanostructures are formed with a catalyst efficiency of about 1×10$^2$ grams of nanostructure/grams of catalyst material or greater.

In some embodiments, the method comprises introducing a reactant vapor comprising a nanostructure precursor material into a reaction chamber, the reactant chamber comprising a catalyst material; contacting the reactant vapor with the catalyst material to cause formation of nanostructures and a product vapor comprising at least one carbon-containing byproduct; and allowing the product vapor to exit the reaction chamber, wherein the product vapor comprises the at least one carbon-containing byproduct in an amount less than 10% of the total volume of product vapor that exits the reaction chamber during formation of the nanostructure.

Figure 1A:
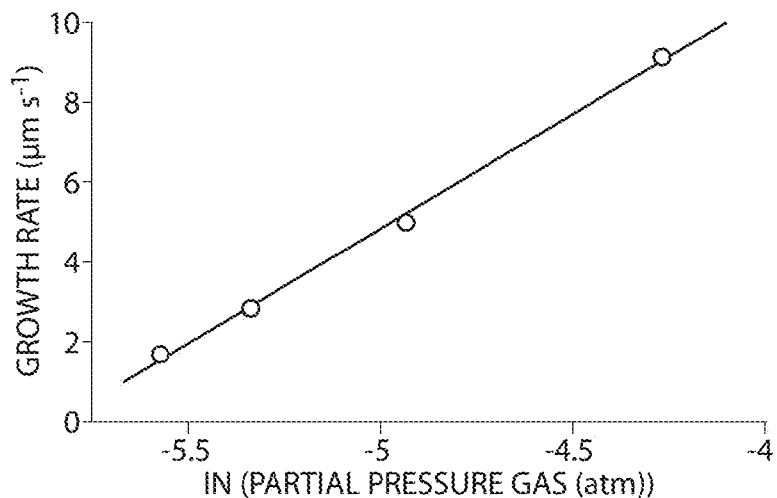
FIG. 1 shows various graphs illustrating the correlation between thermally generated compounds, such as (a) methane, (b), benzene, and (c) methyl acetylene, and increases in VA-MWCNT growth rate.
FIG. 1D shows a graph of CNT growth rate as a function of the partial pressure for some thermally generated compounds, including methane, vinyl acetylene, benzene, and methyl acetylene.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to Understand the invention. All patent applications and patents incorporated herein by reference are incorporated by reference in their entirety. In case of conflict, the present specification, including definitions, will control.

DETAILED DESCRIPTION

The present invention generally relates to the formation and processing of nanostructures, including nanotubes, and related systems and methods. Some embodiments described herein involve simplified processes for nanostructure growth and/or utilize relatively mild conditions. Such methods can both reduce the costs associated with nanostructure formation, as well as reduce the harmful effects of nanostructure fabrication on environmental and public health and safety.

In some cases, methods of the invention advantageously provide the ability to reduce the production of undesired byproducts during nanostructure formation, including volatile organic compounds and/or polycylic aromatic hydrocarbons, thereby reducing the total amount of carbonaceous material being vented to the atmosphere. Some embodiments described herein also provide the ability to form nanostructures without pre-treatment (e.g., thermal pre-treatment) of the nanostructure precursor material. For example, the method may involve incorporation of one or more additives (e.g., alkyne additives) within the nanostructure precursor material that may facilitate nanostructure formation without need for thermal pre-treatment of the precursor material. Additionally, methods described herein may improve the efficiency (e.g., catalyst efficiency) of nanostructure formation, which can also aid in reducing harmful emissions produced during nanostructure formation. Such methods can reduce manufacturer costs (e.g., feedstock costs), as well as reduce additional losses due to production bans, environmental remediation efforts, and the like.

In some embodiments, methods for forming nanostructures are provided. In some cases, the method may involve a chemical vapor deposition process. For example, the method may involve contacting a reactant vapor with a catalyst material, and allowing the reactant vapor to undergo a chemical reaction with the catalyst material to produce a desired product. In some embodiments, gaseous precursor materials, selected for their ability to be converted to a particular desired product, may be introduced directly to a catalyst material in order to form the desired product in high yield and to reduce the formation of potentially harmful and unintended byproducts. For example, a reactant vapor comprising a nanostructure precursor material may contact a catalyst material (e.g., a metal or metal oxide catalyst material, a non-metal catalyst material), causing formation of nanostructures, such as nanotubes. In some embodiments, the reactant vapor may comprise various components, including hydrocarbons (e.g., ethylene), hydrogen, helium, alkyne additives, and other components, as described more fully below. In some cases, the reactant vapor may be maintained under relatively mild conditions (e.g., room temperature) prior to contacting the catalyst material, i.e., the reactant vapor is not thermally pre-treated.

Methods of the invention may generally comprise formation or growth of nanostructures on the surface of a catalyst material. In some embodiments, the catalyst material may be arranged on or in the surface of a substrate. In some embodiments, the catalyst may be in powder form. Upon exposure of the catalyst material to a reactant vapor under a set of conditions selected to facilitate nanostructure growth, nanostructures may grow from catalyst material. Without wishing to be bound by theory, the mechanism of nanostructure formation may involve (1) nucleation, wherein a nanostructure precursor material contacts the catalyst material to form a nanostructure cap or a nanostructure/catalyst species; (2) elongation, where additional nanostructure precursor material, such as various carbon units, can add to the growing nanostructure; and (3) termination, where a chemical event (e.g., reductive elimination of hydrogen or water), mechanical stress, catalyst encapsulation, and/or catalyst deactivation may halt nanostructure growth.

Figure 7A:
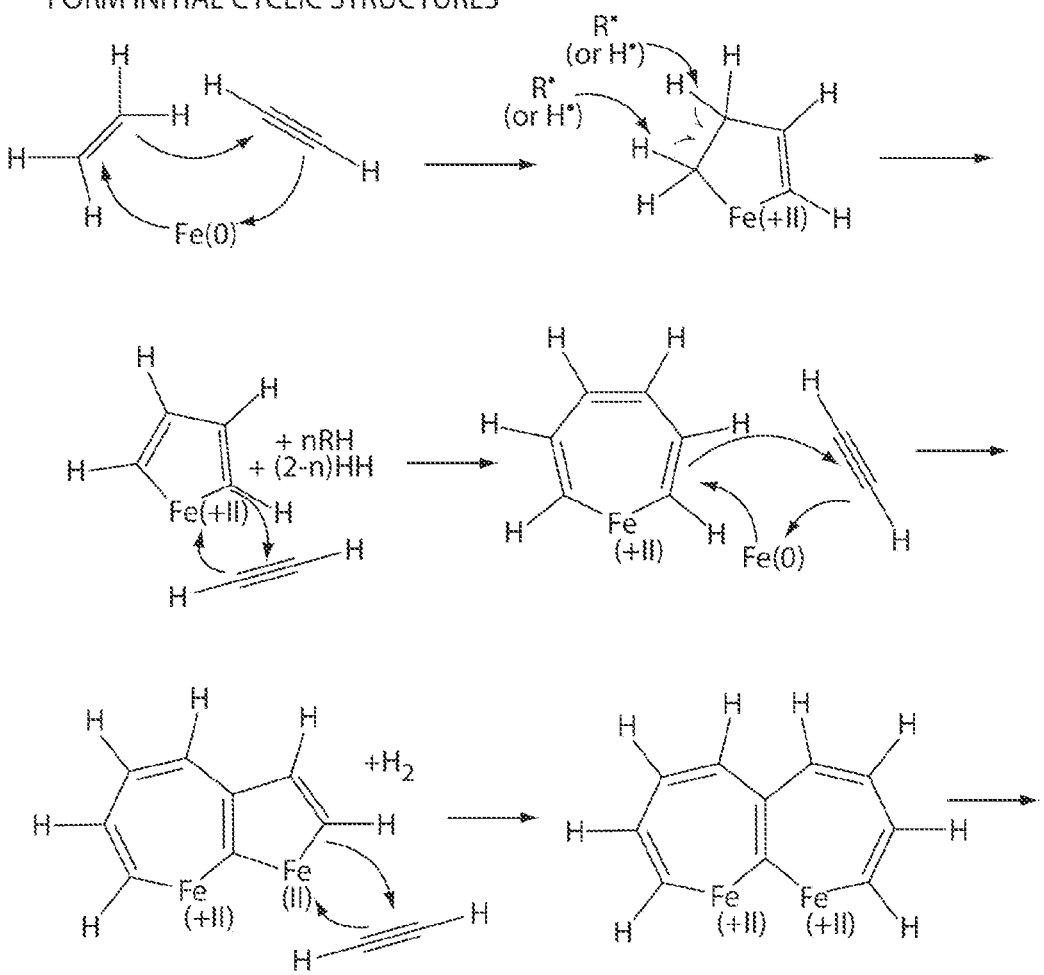
FIG. 7A shows a proposed mechanism for carbon nanotube (CNT) growth.
Figure 7B:
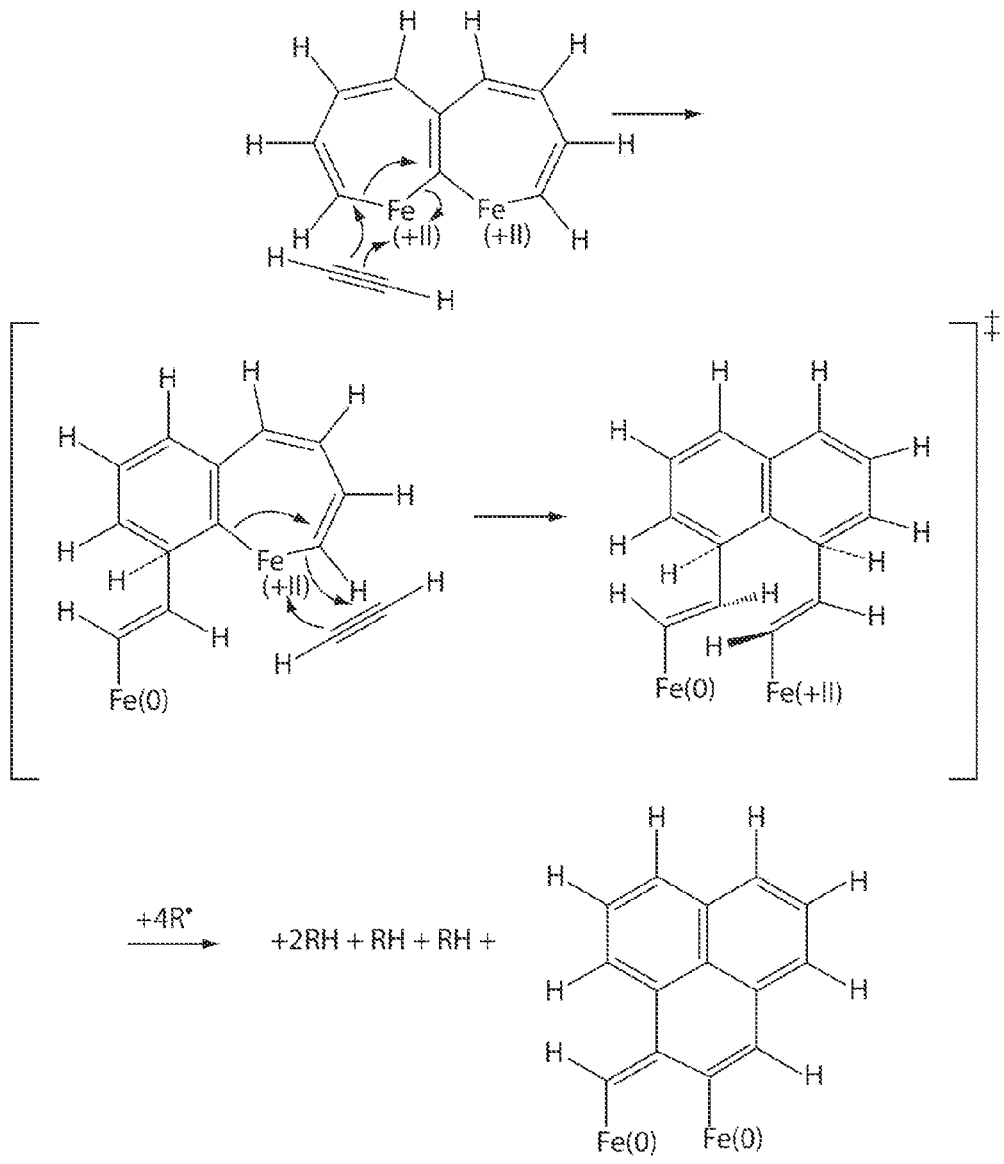
FIG. 7B shows possible propagation steps wherein elongation of the CNT occurs by sequential alkyne or alkene addition.
Figure 8:
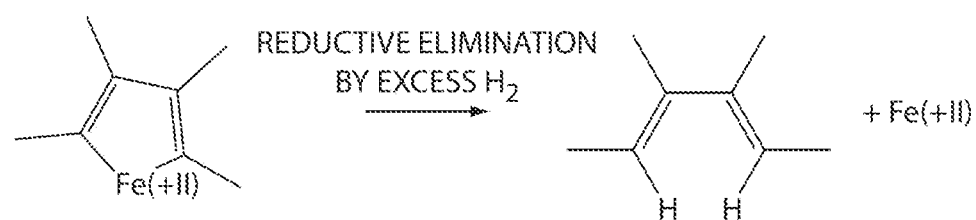
FIG. 8 shows a proposed mechanism for CNT termination.
Figure 8:
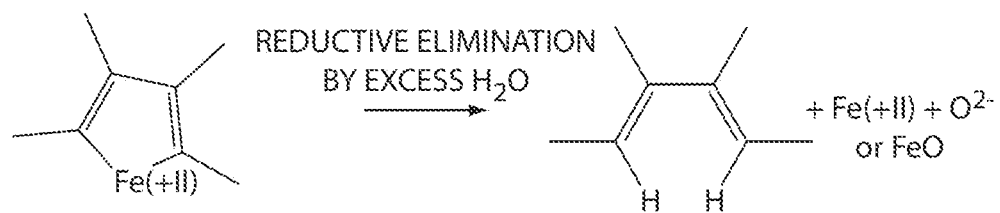

Without wishing to be bound by theory, FIGS. 7-8 show an illustrative embodiment for the mechanism of nanostructure formation. For example, FIG. 7A shows a proposed CNT growth mechanism. During the anneal phase of CNT production, the catalyst was reduced and subject to morphological changes that yield metal nanoparticles. Previous studies have described (1) coupling reactions between alkynes and alkenes that proceed via metallocycles and (2) alkane insertion to a growing C-chain. In some cases, excess hydrogen atoms are liberated without increasing the C-C bond order. FIG. 7B, continued from FIG. 7A, shows possible propagation steps wherein elongation of the CNT occurs by sequential alkyne or alkene addition. An unstable transition state is depicted, where excess hydrogen atoms are liberated by reaction with radicals (R.) and resultant electrons add to the CNT lattice and ultimately reduce the metal catalyst.

FIG. 8 shows a proposed mechanism for CNT termination. Previous studies have indicated that water can potentially cleave catalyst-CNT bonds. In some cases, excess gas-phase hydrogen could also terminate growth.

The methods described herein may be useful in the formation of a wide range of nanostructures, including carbon nanotubes. In some embodiments, the nanostructures are single-walled carbon nanotubes or multi-walled carbon nanotubes. In some embodiments, the method may produce a set of substantially aligned nanostructures formed on the surface of the catalyst material. As used herein, a "set of substantially aligned nanostructures" refers to nanostructures which are oriented such that their long axes are substantially non-planar or substantially non-parallel with respect to the surface of the catalyst material and/or substrate. In some cases, the nanostructures are arranged on or in a surface of the catalyst material, such that the long axes of the nanostructures are oriented in a substantially non-parallel (e.g., substantially perpendicular) direction with respect to the surface of catalyst material and/or substrate (e.g., a nanostructure "forest"). In some embodiments, the nanostructures are vertically aligned multi-walled carbon nanotubes. In other embodiments, the nanostructures may be arranged on or in a surface of the catalyst material, such that the long axes of the nanostructures are substantially parallel to the surface. For example, the nanostructures may be formed or grown with their long axis along the surface of a substrate.

Using methods described herein, nanostructures having high purity may be formed. For example, nanostructures may be formed with reduced amounts of carbon-containing byproducts, catalyst impurities, and other non-nanostructure materials in the final product. In some embodiments, the product may comprise at least 30%, at least 40%, at least 50%, at least 60%, at least 70%, at least 80%, at least 90%, or, in some embodiments, at least 95% nanostructures, as determined by thermal gravimetric analysis. In one set of embodiments, the product may comprise about 80% to about 95% (e.g., 84-94%) nanostructures, as determined by thermal gravimetric analysis.

As described herein, some embodiments provide methods where the reactant vapor is maintained under relatively mild conditions (e.g., without plasma or thermal treatment), prior to contacting the catalyst material. In previous methods, the reactor vapor is typically thermally treated at high temperatures (e.g., >400° C.) prior to contact with a catalyst material, and/or is exposed to the catalyst material while maintained at high temperatures, in order to successfully produce nanostructures. However, as a result, many undesired byproducts are produced. An advantageous feature of the present invention is that such thermal pre-treatment of the reactant vapor (e.g., nanostructure precursor material) may be eliminated, substantially reducing or preventing the formation of unwanted by-products (e.g., toxics, greenhouse gases, and smog-forming compounds), as well as reducing energetic demands and improving overall control over the synthesis.

In some cases, methods are provided for the catalytic formation of nanostructures using reactant vapors maintained at relatively lower temperatures (e.g., below 400° C.). For example, the reactant vapor may include a nanostructure precursor material, wherein at least some of the nanostructure precursor material may undergo the chemical reaction upon exposure of the catalyst material to the reactant vapor. In some embodiments, the reactant vapor may be maintained at temperatures less than 400° C., prior to contacting the catalyst material. In some embodiments, the reactant vapor is maintained at a temperature of less than 400° C., less than 300° C., less than 200° C., less than 100° C., less than 75° C., less than 50° C., less than 30° C., or, in some cases, less than 25° C., prior to contacting the catalyst material. In some cases, the reactant vapor comprises a nanostructure precursor material and is maintained at a temperature of less than 400° C., such that at least 10%, 25%, 50%, 75%, or greater, of the nanostructure precursor material may undergo the chemical reaction upon exposure to the catalyst material.

In some embodiments, the method may advantageously allow for the production of nanostructures with reduced formation of undesired byproducts, including various carbon-containing byproducts. As used herein, the term "byproduct" refers to an undesired or unintended species that may be formed during a reaction catalyzed by the catalytic material. For example, in the context of the invention, a byproduct generally refers to any product of a chemical or thermal reaction (e.g., a reaction that is catalyzed by the catalyst material), that is not a nanostructure. A byproduct, however, does not refer to species that undergo essentially no net chemical alteration or transformation upon exposure to a catalyst material (e.g., are "unreacted"), but that may later be recovered as unreacted starting material. For example, a reactant gas comprising ethylene may be introduced into a reaction chamber comprising a catalyst material to produce a nanostructure product, and any unreacted ethylene that exits the reaction chamber is not considered a byproduct. In some cases, an undesired byproduct is a species that can adversely affect certain properties of the desired reaction product, i.e., the nanostructures, or may otherwise be harmful to public health or the environment. For example, previous methods of nanostructure formation often produced large quantities of undesired carbon-containing byproducts, including volatile organic compounds and polycyclic aromatic hydrocarbons, both of which can pose various health and environmental dangers. In some cases, such carbon-containing byproducts were formed at high temperatures (e.g., >400° C.).

In some embodiments, methods described herein may provide the ability to form nanostructures with significant reduction in the formation of byproducts. For example, the method may involve contacting, in a reaction chamber, a reactant vapor with a catalyst material, resulting formation of a product vapor, wherein the product vapor includes at least one, undesired carbon-containing byproduct in an amount less than 10% of the total volume of product vapor that exits the reaction chamber during formation of the nanostructure. In some cases, the product vapor includes at least one carbon-containing byproduct in an amount less than 5%, less than 2.5%, or less than 1% of the total volume of product vapor that exits the reaction chamber during formation of the nanostructure.

In some cases, the product vapor comprises one or more volatile organic compounds in an amount less than 10%, less than 5%, less than 3%, less than 2.6%, less than 2%, less than 1.5%, less than 1%, or less than 0.9% of the total volume of product vapor that exits the reaction chamber during formation of the nanostructure. In embodiments where ethylene is, a nanostructure precursor material, the volatile organic compound is not ethylene and the amount of volatile organic compound present in the product vapor is calculated to exclude ethylene. As used herein, the term "volatile organic compound" is given its ordinary meaning in the art and refers to an organic chemical species having a sufficiently high vapor pressure to evaporate at room temperature, thereby entering the atmosphere. In some cases, the term "volatile organic compound" excludes species which, in a particular process, are present in the reactant vapor as nanostructure precursor materials, such as ethylene. Examples of volatile organic compounds include hydrocarbons such as alkanes, alkenes, aromatic compounds, and the like, such as methane, ethane, propane, propene, 1,2-butadiene, 1,3-butadiene, 1,3-butadiyne, pentane, pentene, cyclopentadiene, hexene, or benzene. In some embodiments, the volatile organic compound is methane, 1,3-butadiene, or benzene.

In some embodiments, where methane is not a nanostructure precursor material and is substantially not present in the reactant vapor, the product vapor comprises methane in an amount less than 10%, less than 5%, less than 2.5%, less than 1%, less than 0.5%, less than 0.4%, less than 0.3%, less than 0.2%, less than 0.1%, less than 0.05%, or, in some cases, less than 0.01%, of the total volume of product vapor that exits the reaction chamber during formation of the nanostructure.

In some embodiments, where 1,3-butadiene is not a nanostructure precursor material and is substantially not present in the reactant vapor, the product fluid comprises 1,3-butadiene in an amount less than less than 10%, less than 5%, less than 2.5%, less than 1%, less than 0.5%, less than 0.4%, less than 0.3%, less than 0.2%, less than 0.1%, or, in some cases, less than 0.05%, of the total volume of product vapor that exits the reaction chamber during formation of the nanostructure.

In some embodiments, where benzene is not a nanostructure precursor material and is substantially not present in the reactant vapor, the product fluid comprises benzene in an amount less than less than 10%, less than 5%, less than 2.5%, less than 1%, less than 0.5%, less than 0.3%, less than 0.1%, less than 0.05%, less than 0.01%, less than 0.005%, less than 0.001%, less than 0.0005%, or, in some cases, less than 0.0001%, of the total volume of product vapor that exits the reaction chamber during formation of the nanostructure.

In some embodiments, the amount of volatile organic compound generated during nanostructure formation may be reduced by a factor of 10, 20, 30, 40, 50, 60, of greater, relative to previous methods, including methods where the reactant vapor is heated to high temperatures (e.g., 400° C. or greater).

In some cases, the product vapor comprises one or more polycyclic aromatic hydrocarbons formed as an undesired byproduct. As used herein, the term "polycyclic aromatic hydrocarbon" is given its ordinary meaning in the art and refers to carbon species comprising a fused network of aromatic rings. The polycyclic aromatic hydrocarbon may be substantially planar or substantially non-planar, or may comprise a planar or non-planar portion. The term "fused network" might not include, for example, a biphenyl group, wherein two phenyl rings are joined by a single bond and are not fused. Generally, the polycyclic aromatic hydrocarbons may include four-, five-, six-, or seven-membered rings. However, it should be understood that rings of other sizes may be included. Examples of polycyclic aromatic hydrocarbons include naphthalene, acenaphthalene, fluorene, phenanthrene, anthracene, fluoranthene, pyrene, chrysene, coronene, triphenylene, naphthacene, phenanthrelene, picene, fluorene, perylene, or benzopyrene. In some embodiments, the use of methods described herein may reduce the amount of polycyclic aromatic hydrocarbon generated during nanostructure formation by 10%, 20%, 30%, 40%, 50%, 60%, 70%, 80%, 90%, or more, relative to previous methods, including methods where the reactant vapor is heated to high temperatures (e.g., 400° C. or greater).

In some cases, the product vapor includes carbon-containing byproducts which contain two carbon atoms (e.g., ethane), three carbon atoms (e.g., propane), or more.

In some embodiments, the methods described herein may allow for formation of nanostructures with high catalyst efficiency. For example, the nanostructures may be formed with a catalyst efficiency of about $1 \times 10^2$ grams of nanostructure/grams of catalyst material or greater. In some cases, the nanostructures may be formed with a catalyst efficiency of about $2 \times 10^2$, $3 \times 10^2$, $4 \times 10^2$, $5 \times 10^2$, $6 \times 10^2$, $7 \times 10^2$, $8 \times 10^2$, $9 \times 10^2$, $1 \times 10^3$, or greater. In some embodiments, the nanostructures may be formed with a catalyst efficiency of about $5 \times 10^2$ to $1.1 \times 10^3$. The catalyst efficiency may also be improved, relative to previous methods, by use of a reactant vapor that is substantially free of an oxygen-containing species or a nitrogen-containing species, as described herein.

The reactant vapor and/or catalyst material may be exposed to a set of conditions suitable for facilitating the production or growth of nanostructures. As used herein, exposure to a "set of conditions" may comprise, for example, exposure to a particular temperature, pH, solvent, chemical reagent, type of atmosphere (e.g., nitrogen, argon, helium, oxygen, etc.), electromagnetic radiation, other source of external energy, or the like, for a period of time. In some cases, the set of conditions may be selected to facilitate nucleation, growth, stabilization, removal, and/or other processing of nanostructures. In some cases, the set of conditions may be selected to facilitate reactivation, removal, and/or replacement of the catalyst material. In some cases, the set of conditions may be selected to maintain the catalytic activity of the catalyst material. Some embodiments may involve a set of conditions comprising exposure to a source of external energy, including electromagnetic radiation, electrical energy, sound energy, thermal energy, or chemical energy.

As described herein, in some embodiments, the reactant vapor may be maintained at a temperature below about 400° C. prior to exposure to the catalyst material. In some embodiments, the reactant vapor may be maintained at a temperature less than about 300° C., 200° C., 100° C., 75° C., 50° C., 30° C., or, in some cases, less than about 25° C., prior to contacting the catalyst material. For example, this may be achieved by use of an apparatus capable of separately controlling/maintaining the temperatures of the reactant vapor and the catalyst substrate. (FIG. 6B) That is, the apparatus may be capable of locally heating the reactant vapor and/or catalyst material. In some cases, it may be desirable to maintain the reactant vapor and the catalyst material at similar temperatures. In some cases, it may be desirable to maintain the reactant vapor and the catalyst material at different temperatures. In some embodiments, it may be desirable to minimize the heating of the reactant vapor during nanostructure formation. However, it should be understood that the methods and systems described herein may be useful for reactions conducted at temperatures greater than 400° C. In some embodiments, a reaction employing reactant vapors and/or catalyst materials described herein may be performed at greater than 600° C., 700° C., 800° C., greater than 900° C., or greater.

Some embodiments involve maintaining the catalyst material at a certain temperature during nanotube formation. In some cases, the catalyst material may be maintained at a temperature of at least 50° C., at least 100° C., at least 200° C., at least 300° C., at least 400° C., at least 500° C., at least 600° C., at least 700° C., at least 800° C., at least 900° C., or, in some cases, at least 1000° C., or greater. The temperature of the catalyst material may be maintained by arranging the catalyst material in combination with a temperature-controlled substrate, such as a resistively heated silicon platform.

In some cases, the method may involve pre-heating the reactant vapor, prior to exposure to the catalyst material. The reactant vapor may then be cooled to and maintained at a temperature below 400° C. In some cases, the reactant vapor may be pre-heated to a temperature of at least about 60° C., about 80° C., about 100° C., about 200° C., about 300° C., about 400° C., about 500° C., about 600° C., about 700° C., about 900° C., about 1000° C., about 1100° C., about 1200° C., about 1300° C., about 1400° C., about 1500° C., or greater. In one set of embodiments, the reactant vapor may be pre-heated to a temperature between about 700° C. and about 1200° C. The pre-heated reactant vapor may then be cooled to a temperature below about 400° C. (e.g., room temperature), and introduced into a reaction chamber comprising the catalyst material. It should be understood that, in some cases, it may be desirable for the method to not include a pre-heating step.

Some embodiments of the invention may comprise the use of an additive that may enhance formation of the nanostructures. For example, incorporation of an alkyne additive in the reactor vapor may increase the growth rate of the nanostructures. In some embodiments, the use of an alkyne additive within the reactant vapor may eliminate the need for thermal pre-treatment of the reactant vapor. As used herein, the term "alkyne" is given its ordinary meaning in the art and refers to a chemical species containing at least one carbon-carbon triple bond (e.g., "—C≡C—"). The alkyne may comprise one, two, three, or four substituents, any of which may be optionally substituted. In some cases. the alkyne may comprise less than 10, less than 7, or, in some cases, less than 5 (e.g., 4) carbon atoms. The alkyne additive may comprise additional groups, including alkene groups (e.g., carbon-carbon double bonds), i.e., an en-yne group. Examples of alkyne species include acetylene (or "ethyne"), methyl acetylene (or "propyne"), vinyl acetylene (or "but-1-en-3-yne"), 1,3-butadiyne, or the like. In some cases, the use of an alkyne additive in the reactant vapor may produce nanostructures (e.g., nanotubes) at an accelerated growth rate, relative to previous methods (e.g., lacking the alkyne additive). In some embodiments, the incorporation of an alkyne additive may increase the nanostructure growth rate by 10%, 20%, 30%, 40%, 50%, 60%, 70%, 80%, 90%, or greater.

In an illustrative embodiment, the method may involve introducing a reactant vapor comprising a nanostructure precursor material and an alkyne and maintained at low temperature (e.g., at less than about 400° C., or, in some cases, at room temperature) into a reaction chamber comprising a catalyst material, wherein the reactant vapor has not been subjected to pre-heating. The reactant vapor may then be contacted with a catalyst material to cause formation of nanostructures, as well as a product vapor comprising at least one carbon-containing byproduct. The carbon-containing byproduct may be formed in an amount that is at least two, three, four, five, six, seven, eight, nine, or ten times lower than in a product vapor that is formed from an essentially identical reactant vapor lacking the alkyne. In some embodiments, a reactant vapor comprising the nanostructure precursor material and the alkyne may not be subjected to a pre-treatment step (e.g., a pre-heating step) and may be contacted with a catalyst material to form nanostructures and a product vapor containing a significantly reduced amount of carbon-containing byproduct, relative to a product vapor formed from a reactant vapor that has been pre-treated (e.g., pre-heated) prior to contacting the catalyst and that lacks the alkyne. In some cases, a non-pre-heated reactant vapor comprising an alkyne may produce carbon-containing byproduct molecules in amounts that are ten times less than a pre-heated reactant vapor lacking an alkyne.

As noted above, the reactant gas may comprise various components. In some embodiments, the reactant gas comprises a nanostructure precursor material. As used herein, a "nanostructure precursor material" refers to any material or mixture of materials that may be reacted to form a nanostructure under the appropriate set of conditions, such as exposure to a catalyst material. In some cases, the nanostructure precursor material includes a gas or mixture of gases. For example, the nanostructure precursor material may comprise a hydrocarbon (e.g., $C_2H_4$ and $CH_4$, etc.), one or more fluids (e.g., gases such as $H_2$, $O_2$, helium, argon, nitrogen, etc.), or other chemical species that may facilitate formation of nanostructures (e.g., alkynes).

In some embodiments, the reactant vapor comprises a hydrocarbon, hydrogen, and optionally an alkyne additive. For example, the reactant vapor may include 35% or less hydrocarbon, wherein the hydrocarbon is not an alkyne, 70% or less hydrogen, and optionally 10% or less, 1% or less, or 0.1% or less alkyne additive, by volume. In some cases, the reactant vapor comprises 35% or less ethylene, 70% or less hydrogen, and 0.1% or less alkyne, by volume. Where the sum of the relative amounts of hydrocarbon, hydrogen, and alkyne additive, if present, do not equal 100%, additional components may be included in the reactant vapor, such as helium or argon, or mixtures thereof, to bring the total to 100%.

In some embodiments, the reactant vapor comprises about 16% to about 35% ethylene, by volume. In some embodiments, the reactant vapor comprises about 16% to about 70% hydrogen, by volume. In some embodiments, the reactant vapor further comprises helium. For example, the reactant vapor may comprise 20% ethylene, 51% hydrogen, and 29% helium, by volume. In some embodiments, the reactant vapor further comprises argon. In some embodiments, the reactant vapor further comprises a mixture of helium and argon.

In another set of embodiments, the reactant vapor may include ethylene, hydrogen, and an alkyne.

In some cases, the reactant gas is substantially free of an oxygen-containing species, such as an alcohol, an ether, a ketone (e.g., acetone), an ester, an amide, or the like, or a nitrogen-containing species, such as an amine. As used herein, "substantially free of an oxygen-containing species or a nitrogen-containing species" means that the reactant gas includes less than 1%, less than 0.5%, or less than 0.1%, or less than 0.01%, by volume, of an oxygen-containing species or nitrogen-containing species. In one set of embodiments, the reactant vapor is substantially free of acetone. That is, acetone is not present as a co-reactant in, for example, nanostructure formation. In one set of embodiments, the reactant vapor is substantially free of ethanol. In some cases, the oxygen-containing species is not water.

Systems for forming nanostructures are also provided. The system may comprising a catalyst material with a surface suitable for growing nanostructures thereon, and a region in which the surface of the catalyst material, or portion thereof, may be exposed to a set of conditions selected to cause catalytic formation of nanostructures on the surface of the catalyst material. In one set of embodiments, a system includes a reaction chamber. As used herein, a "reaction chamber" refers to an apparatus within which catalytic formation of nanostructures may take place. The reaction chamber may be constructed and arranged to be exposed to a source of a reactant vapor such that the reactant vapor may be processed to form nanostructures. In some embodiments, the reaction chamber may comprise catalyst materials as described herein positioned within the reaction chamber which may be exposed to the source of the reactant vapor. As used herein, a system "constructed and arranged to be exposed to a source of a reactant vapor" is a term that would be understood by those of ordinary skill in the art, and is given its ordinary meaning in this context and, for example, refers to a system provided in a manner to direct the passage of a fluid (e.g., vapor), such as a fluid that is or that includes a hydrocarbon, over the catalyst material positioned within the reaction chamber. The "source of a reactant vapor" may include any apparatus comprising a reactant vapor, any apparatus or material that may be used to produce a reactant vapor, and the like. A "reactant vapor" as used herein refers to a gas or mixture of gases that may include a hydrocarbon (e.g., ethylene, etc.) and/or other components, including hydrogen, helium, and/or other additives such as alkynes. The reaction chamber may also include an outlet via which a fluid, such as a product vapor, may exit upon completion of the reaction.

As used herein, the term "nanostructure" refers to elongated chemical structures having a diameter on the order of nanometers and a length on the order of microns to millimeters, resulting in an aspect ratio greater than 10, 100, 1000, 10,000, or greater. In some cases, the nanostructure may have a diameter less than 1 µm, less than 100 nm, 50 nm, less than 25 nm, less than 10 nm, or, in some cases, less than 1 nm. Typically, the nanostructure may have a cylindrical or pseudo-cylindrical shape. In some cases, the nanostructure may be a nanotube, such as a carbon nanotube.

As used herein, the term "nanotube" is given its ordinary meaning in the art and refers to a substantially cylindrical molecule or nanostructure comprising a fused network of primarily six-membered aromatic rings. In some cases, nanotubes may resemble a sheet of graphite formed into a seamless cylindrical structure. It should be understood that the nanotube may also comprise rings or lattice structures other than six-membered rings. Typically, at least one end of the nanotube may be capped, i.e., with a curved or nonplanar aromatic group. Nanotubes may have a diameter of the order of nanometers and a length on the order of millimeters, or, on the order of tenths of microns, resulting in an aspect ratio greater than 100, 1000, 10,000, or greater. In some cases, the nanotube is a carbon nanotube. The term "carbon nanotube" refers to nanotubes comprising primarily carbon atoms and includes single-walled nanotubes (SWNTs), double-walled CNTs (DWNTs), multi-walled nanotubes (MWNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the nanotube may have a diameter less than 1 µm, less than 100 nm, 50 nm, less than 25 nm, less than 10 nm, or, in some cases, less than 1 nm.

It should be understood that formation of nanotubes is described herein by way of example only, and that other nanostructures may also be formed using methods of the invention, including nanotubes, nanowires, nanofibers, and the like.

The catalyst material may be any material capable of catalyzing growth of nanotubes. The material may be selected to have high catalytic activity and/or compatibility with a substrate, such that the catalyst material may be deposited or otherwise formed on the surface of the growth substrate. For example, the catalyst material may be selected to have a suitable thermal expansion coefficient as the substrate to reduce or prevent delamination or cracks. The catalyst material may be positioned on or in the surface of the growth substrate. In some cases, the catalyst material may be formed as a coating or pattern on the surface of the substrate, using known methods such as lithography. In other embodiments, the substrate may be coated or patterned with the catalyst material by contacting at least a portion of the substrate with a solution, film, or tape comprising the catalyst material, or precursor thereof.

Materials suitable for use as the catalyst material include metals, for example, a Group 1-17 metal, a Group 2-14 metal, a Group 8-10 metal, or a combination of one or more of these. Elements from Group 8 that may be used in the present invention may include, for example, iron, ruthenium, or osmium. Elements from Group 9 that may be used in the present invention may include, for example, cobalt, rhenium, or iridium. Elements from Group 10 that may be used in the present invention may include, for example, nickel, palladium, or platinum. In some cases, the catalyst material is iron, cobalt, or nickel. In an illustrative embodiment, the catalyst material may be iron nanoparticles, or precursors thereof, arranged in a pattern on the surface of the growth substrate. The catalyst material may also be other metal-containing species, such as metal oxides, metal nitrides, etc. For example, the catalyst material may be a metal nanoparticle. Those of ordinary skill in the art would be able to select the appropriate catalyst material to suit a particular application.

In some embodiments, the catalyst may comprise iron. For example, iron may be formed on the surface of a substrate (e.g., a silicon substrate). In some embodiments, the substrate may comprise silicon. In some embodiments, the substrate may comprise aluminum oxide formed on silicon.

In some cases, nanotubes may be synthesized using the appropriate combination of nanotube precursors and/or catalyst materials. In some embodiments, the nanotube precursors may be delivered sequentially or simultaneously (e.g., as a mixture of nanotube precursors).

The catalyst material may be formed on the surface of the growth substrate using various methods, including chemical vapor deposition, Langmuir-Blodgett techniques, deposition from a solution of catalyst material, or the like.

The substrate may be any material capable of supporting catalyst materials and/or nanostructures as described herein. The growth substrate may be selected to be inert to and/or stable under sets of conditions used in a particular process, such as nanostructure growth conditions, nanostructure removal conditions, and the like. In some cases, the growth substrate may comprise alumina, silicon, carbon, a ceramic, or a metal. In some embodiments, the growth substrate comprises $Al_2O_3$ or $SiO_2$ and the catalyst material comprises iron, cobalt, or nickel. In some cases, the growth substrate comprises $Al_2O_3$ and the catalyst material comprises iron.

EXAMPLES

Using in situ CNT height measurements and complimentary gas analysis, thermally generated compounds that were correlated with CNT formation rate (e.g., methyl acetylene and vinyl acetylene) were identified. To demonstrate that these alkynes were responsible for rapid CNT growth, each chemical and typical feedstock gases was delivered, without heating, directly to a locally heated metal catalyst substrate. The tested alkynes accelerated CNT formation to rates comparable to or greater than those achieved via thermal treatment of the feedstock gas. Ethene and hydrogen were still required for efficient CNT formation, but their input concentrations could be reduced by 20 and 40%, respectively, without sacrificing CNT growth rate. Using this new approach of unheated, alkyne-assisted CNT growth, emissions of volatile organic compounds and polycyclic aromatic hydrocarbons were reduced by more than an order of magnitude compared to traditional CVD approaches. Furthermore, the chemical studies presented here shed new light on the current understanding of CNT synthesis, suggesting that a metal-catalyzed polymerization reaction, rather than a metal-mediated precipitation reaction, is responsible for CNT formation.

To improve efficiency of CNT formation, studies were conducted to investigate the mechanism(s) of CNT formation mechanism(s). Typically, a CVD process involves the introduction of a gaseous carbon precursor (e.g., CO, $C_2H_4$, or $CH_4$) to a heated (e.g., 700-1000° C.) reaction zone that contains a free-floating or substrate-supported metal catalyst (e.g., Fe, Ni, or Co). CNT growth process is generally described by three stages: nucleation, elongation, and termination. Without wishing to be bound by theory, a proposed mechanism involves dissociation of the carbon-containing precursor at the metal catalyst during nucleation to form a CNT cap. During elongation, carbon can add to the growing CNT by continual dissociation at, diffusion into, and/or precipitation from the metal catalyst (i.e., the vapor-liquid-solid (VLS) model). This addition of single carbon units may continue until termination, where mechanical stress, catalyst encapsulation, and/or catalyst deactivation may halt CNT growth.

Recent studies have shown that, in some cases, distinct effects can arise from the independent thermal treatment of the carbonaceous feedstock and the metal catalyst. In particular, heating and cooling ("pre-heating") the feedstock gas prior to impingement on a metal catalyst is often necessary for rapid growth of vertically aligned multi walled CNTs (VA-MWCNTs), enhancing the CNT formation rate by over 2000% compared to when the gas is heated only at the catalyst. However, this thermal pre-treatment step generates a suite of volatile organic compounds (VOCs) (from an ethene feedstock) some of which may be responsible for enhanced CNT formation and others of which may diminish CNT quality and present environmental and occupational concern.

As described herein, these competing processes may be substantially reduced and, in some cases, eliminated, by selective delivery of critical CNT precursors, rather than relying on thermal generation to provide a subset of necessary reactants in a complex mixture of chemicals. Furthermore, avoiding the thermal treatment of the feedstock gas would remove the most energetically expensive component of the synthesis and potentially improve the carbon-to-CNT mass conversion efficiency.

In the following examples, compounds on the critical path to CNT formation were identified by monitoring in situ VA-MWCNT growth rate as potentially important molecules were delivered directly to the catalyst. With these results, co-optimization of the synthetic process was performed by (1) minimizing cost by selecting potent reagent gases that require minimal thermal treatment, (2) maximizing production growth rates, and (3) minimizing unwanted side-products that deteriorate product quality (e.g., soot and polycyclic aromatic hydrocarbons (PAHs)) and that threaten the health of the public and the environment (e.g., toxics, greenhouse gases, and compounds that promote the formation of secondary pollutants).

Materials.

Helium, hydrogen, ethene, methane, acetylene, and 1% acetylene (mixed with helium) were purchased from Metro Welding (Ann Arbor, Mich.) or AirGas (all ultra high purity (UHP) grade). Before use and prior to introduction to a mass flow controller, pure acetylene was filtered through a Porasil-C packed column immersed in a cyrogenic solution (acetone/$N_2$(l) or acetonitrile/$N_2$(l), both −39-41° C.) to remove acetone (which is used as a stabilizer to prevent reaction in the acetylene tank). Mass spectral analysis indicated that acetone was removed to below the detection limit (<ppmv) by this method. The 1% acetylene mixture did not require purification, as it was free of acetone when shipped from the manufacturer (who employ industrial cartridge removal of acetone). Other gases, including 1,3-butadiene, but-1-ene-3-yne (1% mixture in helium), methyl acetylene, ethane, and 1-butyne, were purchased from Air Liquide America Specialty Gas in high purity. Diluted mixtures of methane and ethane were prepared by flushing 300-mL stainless steel (SS) tanks with the gas of interest, pressurizing the tanks to some low pressure (e.g., 5 psi), and then further pressurizing the tank with He to approximately 250 psi. Benzene was prepared by adding over 30 mL of benzene to a 300-mL SS tank, flushing the tank with He (without removing the benzene), and pressurizing the tank to 250 psi. In all cases where He (UHP grade) was used to prepare test gases, it was further purified with a Porasil-C packed column immersed in $N_2$ (l).

VOC Collection and Analysis.

VOCs (and PAHs) were collected and analyzed as detailed in Plata, et al, "Early evaluation of potential environmental impacts of carbon nanotube synthesis by chemical vapor deposition," *Environ. Sci. Technol.* 2009, 43, 8367-8373, the contents of which are incorporated herein by reference in its entirety for all purposes. Briefly, stainless steel canisters were placed downstream of the reactor tube and flushed for the duration of CNT growth. Gas samples were collected just after growth termination and sealed with stainless steel ball valves. Considering the flow rate of the gas and volume of the cylinder, these samples represent a 30-second integrated signal of VOCs forming during the reaction. Simultaneous measurements of VOC composition in the effluent gases were made using an online mass spectrometer (MS, Pfeiffer OmniStar™) and monitoring relevant ions (m/z 2, 4, 12-18, 25-30, 32, 39-42, 44-45, 51-54, 65-66, 77-78, 91). These real-time analyses indicated that gas composition over a 30-second interval during the growth cycle was stable. VOCs in the stainless steel canisters were quantified by gas chromatography with a flame ionization detector and thermal conductivity detector (GD-FID-TCD with He reference gas) calibrated with standard gas mixtures. Gas samples were pre-focused using a cryogenic ($N_2$(l) trap of Porasil-C treated silica beads before injection on the HayeSep Q column. Detection limits were around 0.1 ppmv. He and $H_2$ were quantified using an additional GC-TCD with a $N_2$ reference gas.

PAH Collection and Analysis.

Briefly, PAHs were concentrated on two consecutive, precleaned polyurethane foam (PUF) filters (3" length×1" diameter). These filters were in place for the entire duration of CNT growth, and the reported PAH abundances represent an integrated signal throughout the growth period. PUFs were extracted by triplicate accelerated solvent extractions (ASE) with a 90:10 dichloromethane:methanol mixture at 100° C. and 1000 psi for 5 min. Each extract was concentrated by rotary evaporation, and analyzed by GC-MS. Analyte recoveries were assessed using surrogate standards ($d_{10}$-acenaphthalene, m-terphenyl, and $d_{12}$-perylene) and ranged from 75±1% for low molecular weight PAHs (128 to 154 amu) to greater than 90±1% for higher molecular weight PAHs (>166 amu). Detection limits were around 1 ng $g_{C\,feedstock}$ (an average of 0.001 parts per trillion by volume).

TGA and Raman Measurements.

Figure 10:
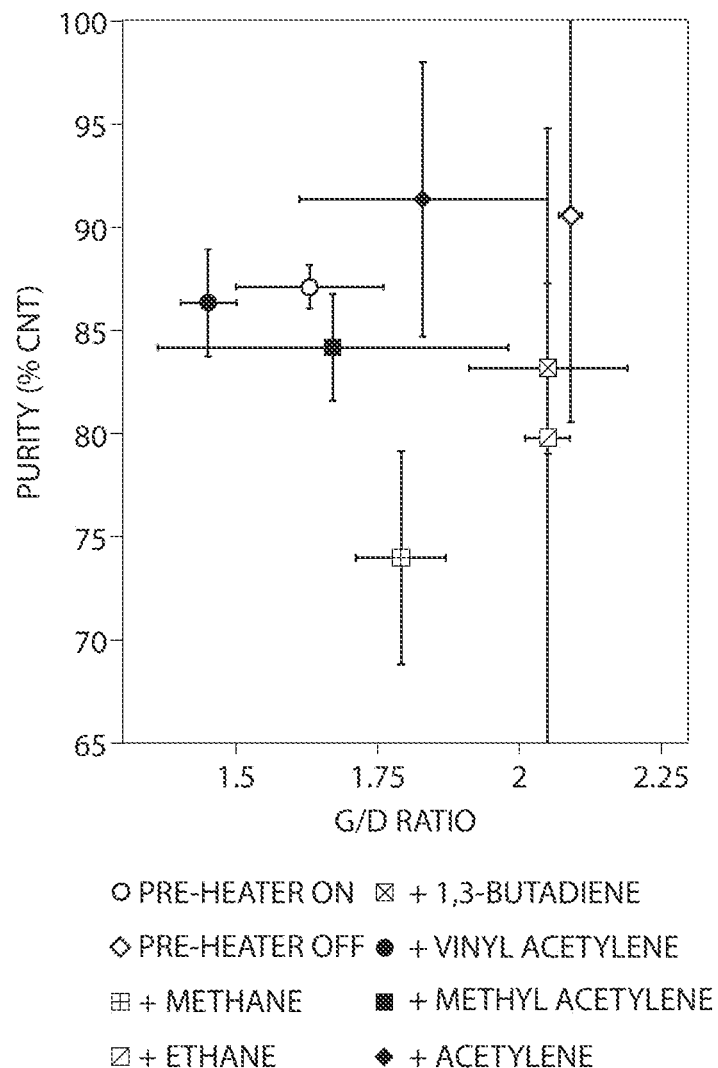
FIG. 10 shows a graph of CNT product purity as a function of G/D ratio for various reaction conditions in the CVD reactor.

Results of these studies are shown in the FIG. 10. TGA measurements were performed using a TA Instruments Q50. Samples were oxidized in 20% oxygen and 80% helium from room temperature to 900° C. at a ramp rate of 5° C. $min^{-1}$ with a 30 min hold. The relative abundance of CNTs and amorphous carbon was calculated using a linear least-squared fit of the differentiated mass loss plot.

CNT structural quality was evaluated by Raman spectroscopy (Dimension P2, Lambda Solutions, λ=533 nm), with a laser power of 20 mW and spot size of ~25 um. Several spectra per sample were acquired, both along the midpoint of the forest side wall and along the height of the forest side wall. The spectra were averaged for each sample, so the reported standard deviation represents the variance throughout the entire forest. G/D values were calculating the area under each peak.

Example 1

Figure 6A:
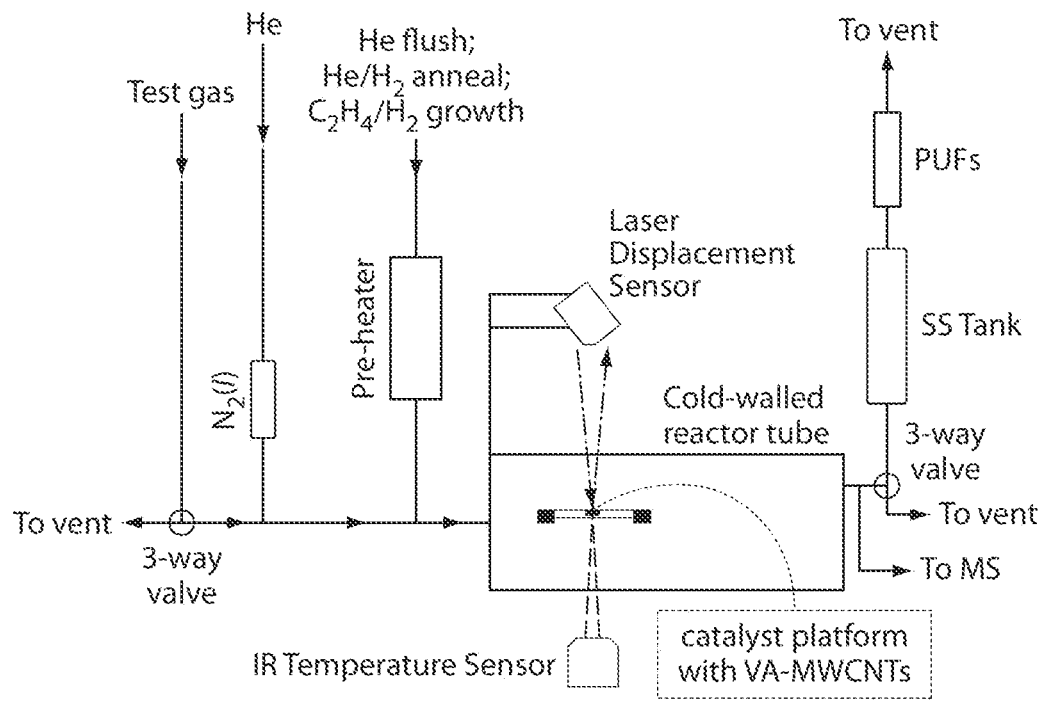
FIG. 6 shows (a) a schematic diagram of a reactor system, according to one embodiment, and (b) a schematic diagram of an atmospheric-pressure, cold-wall CVD reactor with decoupled thermal control over feedstock and catalyst.
Figure 6B:
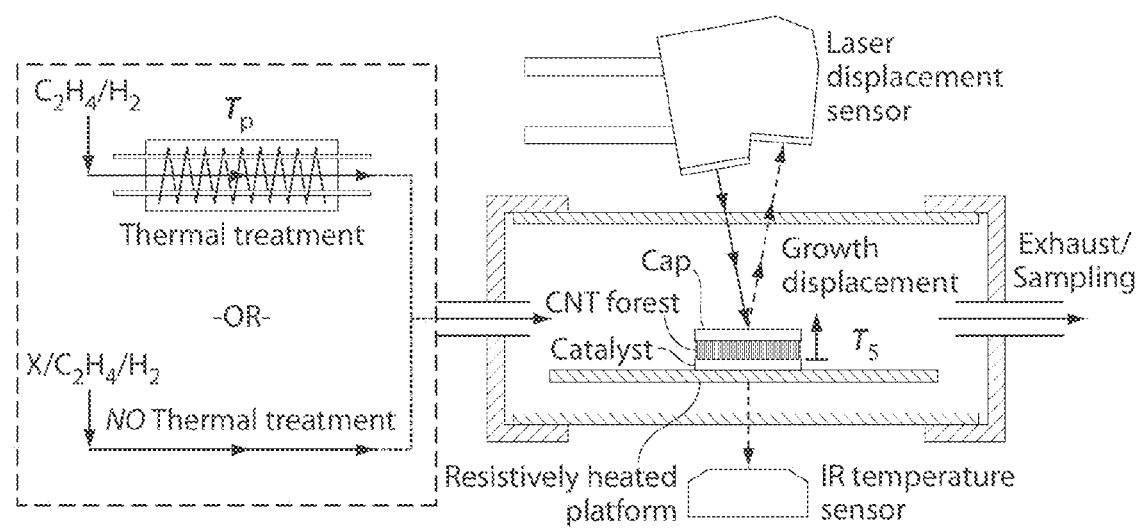

The following example describes the identification of thermally generated CNT precursor molecules. FIG. 6B shows a schematic diagram of an atmospheric-pressure, cold-wall CVD reactor with decoupled thermal control over feedstock and catalyst. Throughout this study, feedstock gases were delivered in one of two modes: (1) with thermal treatment ($T_p$=680-1040° C., $C_2H_4$ and $H_2$ only) or (2) without thermal treatment ($C_2H_4$ and $H_2$ and a test gas, "X"). The catalyst substrate temperature ($T_s$) was 725° C., unless otherwise noted. The height of the growing CNT forest was monitored with a laser displacement sensor. Using the CVD reactor shown in FIG. 6B, the temperatures of the feedstock and catalyst were independently controlled. The $C_2H_4/H_2$ growth mixture was heated to various "pre-heat" temperatures, $T_p$ (860-1040° C.), and then cooled to room temperature prior to impingement on a substrate-affixed, locally-heated metal catalyst (1 nm Fe/10 nm $Al_2O_3$/675 um Si). Simultaneously, the composition of gases evolved from the pre-heater by ex situ gas analysis was monitored, as well as the in situ CNT growth rate by monitoring the height evolution of a vertically aligned CNT "forest" using a laser displacement sensor.

Figure 1B:
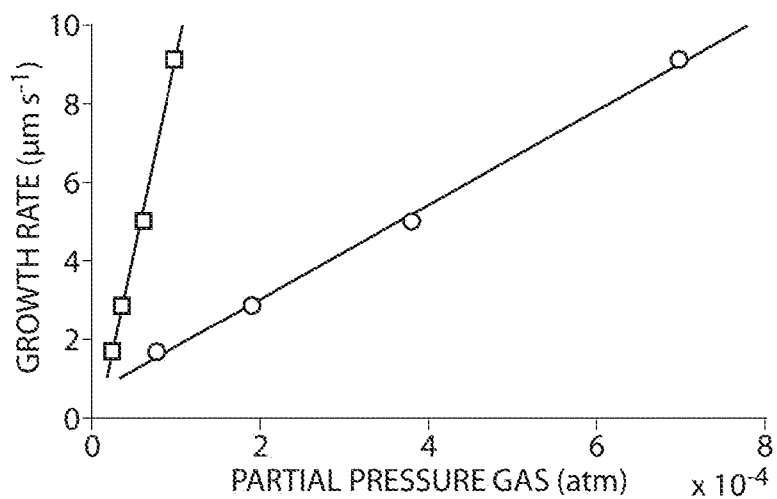
Figure 1C:
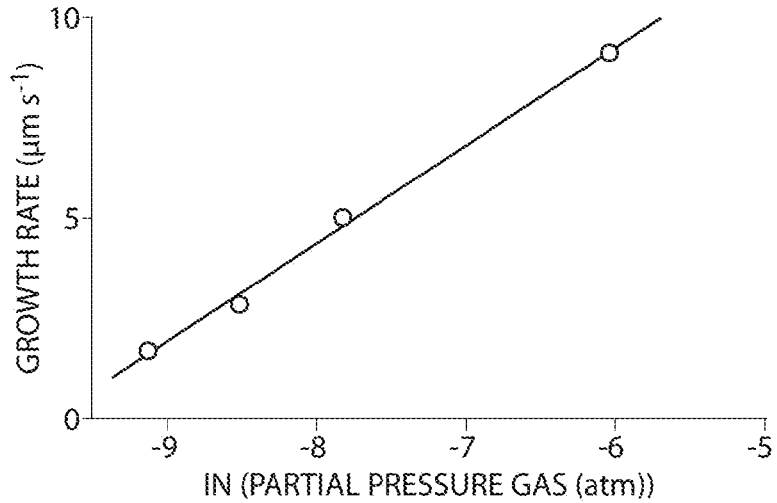
Figure 1D:
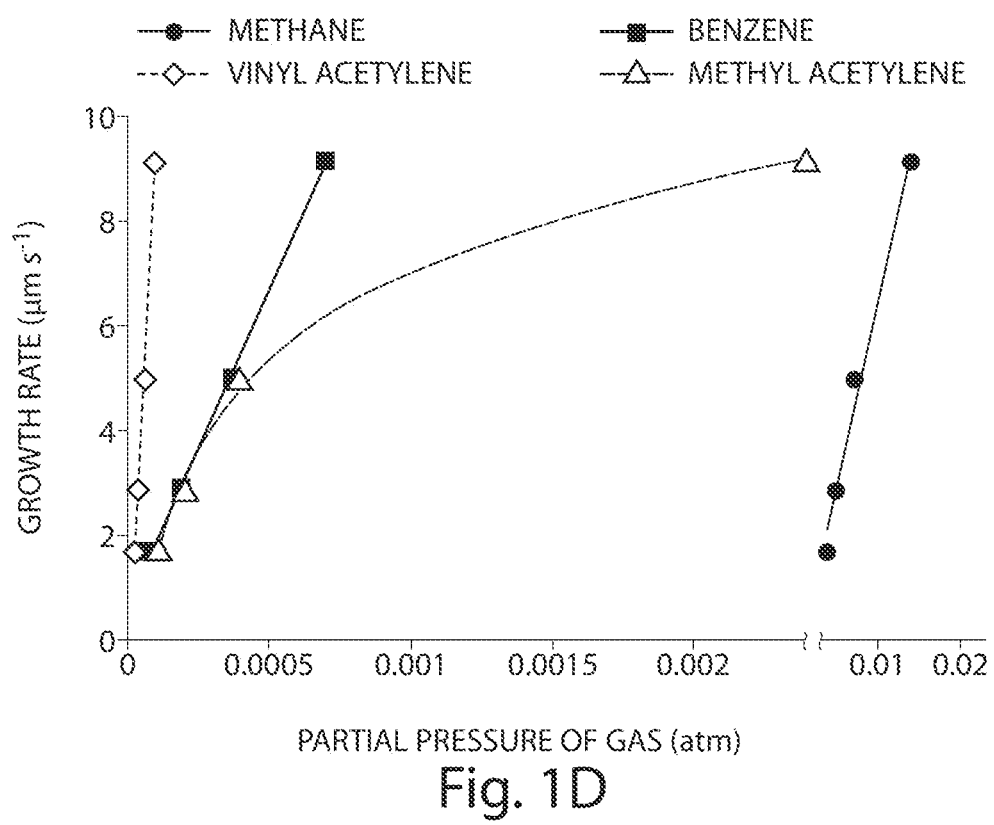

FIG. 1D shows a graph of CNT growth rate as a function of the partial pressure for some thermally generated compounds, including methane, vinyl acetylene, benzene, and methyl acetylene. Resultant concentrations (atm) from four different pre-heat temperatures (860, 920, 970, 1040° C.) are shown, and growth rate increased with temperature. The symbols are measured gas abundances just after the pre-heater tube and the lines are the best-fit curves. The abundances of methane, benzene, and vinyl acetylene were linearly related to the growth rate (all $R^2$=0.99, n=4). The relationship between methyl acetylene and the CNT growth rate was fit by a hyperbola ($R^2$=0.99, n=4). In all experiments, the gas flow during growth was $C_2H_4/H_2/He=70/330/0$ sccm (standard cubic centimeters per minute) and the catalyst substrate temperature was 840° C.

As pre-heat temperature increased, there were strong linear correlations between the growth rate and the partial pressures of methane, benzene, and vinyl acetylene (or but-1-en-3-yne); each with a correlation coefficient ($R^2$) of 0.99 (n=4, FIG. 1D). As the abundance of methyl acetylene (propyne) increased, the growth accelerated to a point of apparent saturation. Thus, at high methyl acetylene concentrations, something other than precursor availability limited the rate of CNT formation. Without wishing to be bound by theory, the hyperbolic behavior is characteristic of catalysis reactions, suggesting that the metal may be acting as a true catalyst for CNT formation, rather than simply providing a template for highly ordered carbon precipitation.

Example 2

The following example describes a general procedure for CNT synthesis. In order to measure in situ VA-MWCNT height during the reaction progress, a custom-built CVD reactor was used with a laser displacement sensor mounted above the growth chamber, as shown by the schematic diagram in FIG. 6A. Traditional growth feedstock gases ($C_2H_4/H_2$) and annealing gases ($He/H_2$) are introduced via a resistively heated pre-heater tube that was operated in two modes: (1) "on" at 1000° C. and (2) "off" at room temperature (21° C.). With the pre-heater off, test gases (e.g., 1,3-butadiene, acetylene, methyl acetylene, 1-butyne, vinyl acetylene, methane, ethane, or benzene) were introduced during the growth phase via a secondary input line, which could be flushed to a vent via a 3-way valve during the flush and anneal phases. The flow rate of the test gas was balanced with an additional helium line that was cryogenically purified with a Porasil-C column immersed in liquid nitrogen. For all experiments, the total flow of gas ($C_2H_4+H_2+He+$test gas) was 604 sccm, except where noted. These were introduced to a cold-walled quartz reactor tube that housed a resistively heated silicon platform, which supported the vertically aligned multi-wall carbon nanotube (VA-MWCNT) catalyst substrate. The temperature of the platform was monitored and controlled (via feedback) by an infrared (IR) temperature sensor, and the growth rate of the VA-MWCNT forest was monitored using a laser displacement sensor. Effluent gases were continually monitored by online mass spectrometry (MS, 2 sccm sampling rate), and subsequently flushed to either a vent (during anneal and flush) or though a stainless steel sampling tank (SS Tank, to collect VOCs, He, and $H_2$), quartz fiber filters (to collect particles >0.2 µm), and polyurethane foams (PUFs, to collect PAHs).

In this reactor, gases were pre-mixed and introduced to a resistively heated quartz pre-heater tube (4×300 mm (inner diameter×length)), cooled to room temperature, and then delivered to a quartz reactor tube (4.8×22.9 cm). Inside the reactor tube, VA-MWCNT thin films were grown on electron-beam deposited Fe (1 nm, such as 1.2 nm) with an $Al_2O_3$ (10 nm) under layer on a Si (600 µm or 675 µm) support. The catalyst substrate temperature was regulated by a localized, resistively heated silicon platform, thereby minimizing gas phase reactions in the growth chamber. The temperature of the silicon platform was measured using an infrared sensor mounted below the reactor tube and fixed at 725° C. for all of these experiments (except where noted). The temperature of the "cool-wall" reactor was less than 70° C. over the length of the platform (4-5 cm) and room temperature elsewhere, as measured by a surface-contact thermocouple place on the outside of the quartz wall. The pre-heater temperature was determined by a thermocouple placed outside of the quartz tube in the center of the resistively heated coils. The pre-heater was operated in two modes: (1) "on" at 1000° C. or (2) "off" at room temperature (21° C.). In both modes, reactant vapors ($C_2H_4/H_2$) traveled through the pre-heater tube and connected to a three-way valve that was installed downstream of the pre-heater. This allowed the introduction of helium carrier gas and specific VOC test gases (e.g., methyl acetylene or vinyl acetylene) to the reactant stream mixture prior to impingement on the catalyst. The sum of these flows (He+VOC test gas) was constant, but the distribution varied; test gases were only introduced when the pre-heater was "off." Given the varying He delivery, the effects associated with trace contaminants (e.g., methane or water) in the UHP grade He were substantially removed by purifying the carrier gas using a $N_2$ (l) cold trap with Porasil-C treated silica beads.

While the mixture of reactant vapors varied during the growth phase, the reactor flush and annealing treatments were kept constant. A typical reactant vapor program included: He flush at 1000 sccm or 2000 sccm for 8 min (where the pre-heater is turned on after 5 min, if applicable), He at 70 or 174 sccm, $H_2$ at 300 or 310 sccm, for 4 min (where the catalyst substrate platform is turned on after 2 min), and $C_2H_4$ (120 sccm), $H_2$ (310 sccm), the VOC test gas, and He were introduced for the duration of the CNT growth (where the summed flow rate of these gases was always 604 sccm, except where noted).

Example 3

Accelerated CNT Growth without Heating Feedstock Gases

Using a decoupled CVD reactor, the temperature of VA-MWCNT metal catalyst and $C_2H_4/H_2$ feedstock was independently controlled while monitoring the composition of gases evolved from the pre-heater, as well as the in situ VA-MWCNT forest growth rate. As the pre-heater temperature increased (from 690 to 1200° C.), the growth rate of the VA-MWCNT forest increased. FIG. 1 shows various graphs illustrating the correlation between thermally generated compounds and increases in VA-MWCNT growth rate. In all subplots, the symbols are measured data and the line is the best-fit curve. FIG. 1A shows methane's abundance was equally well fit by linear and logarithmic relationship with the growth rate ($R^2=0.99$, n=4). FIG. 1B shows that benzene (circles) and vinyl acetylene (squares) were linearly related to the growth rate ($R^2=0.99$, n=4). FIG. 1C shows that methyl acetylene is logarithmically related to the VA-MWCNT growth rate ($R^2=0.99$, n=4). In these experiments, the gas flow during growth was $C_2H_4/H_2/He=70/330/0$ sccm and the catalyst substrate temperature was 825° C. Without wishing to be bound by theory, the accelerated CNT formation may be attributed to some subset of thermally generated compounds, as there were strong correlations between the growth rate and the partial pressures of methane, benzene, and vinyl acetylene (each with correlation coefficients of 0.99; n=4, FIG. 1). The relationship between methane abundance and VA-MWCNT growth was also well fit by a logarithmic curve ($R^2=0.99$, n=4), and methyl acetylene's relationship to the VA-MWCNT growth was best described by a logarithmic fit ($R^2=0.99$, n=4).

Methane is a common CVD feedstock gas and may facilitate effective CNT growth via decomposition on Fe catalyst surfaces. Benzene has been discussed as an important intermediate in CNT formation.

While alkynes (e.g., methyl acetylene and vinyl acetylene) have not been recognized as active molecules in the CNT formation pathway, acetylene has been noted for its relatively efficient conversion to CNT in molecular beam experiments (where gas phase reactions are minimized). However, in those studies, acetone was present as a trace (<1%) component of the commercially available acetylene, and it is unclear if the enhanced growth was an effect of the acetylene itself or the oxygen-containing acetone. (Oxygen-containing compounds can enhance CNT growth. Nevertheless, in homogeneous transition metal catalysis, alkynes have been shown to react with alkenes to form cyclic compounds, which are subsequently released from the active metal. Although CVD is a heterogeneous catalysis that may have some polymerization character, it is possible that alkynes are playing a similar role in CNT formation.

To study the effect that small alkynes (with $C_{n\leq 4}$) have on accelerated VA-MWCNT growth as described herein, a series of potential pre-cursor molecule were delivered to a heated metal catalyst without thermal treatment of the feedstock gas. To simulate the growth environment that would be generated by the pre-heater (without the convolution of the more than 40 thermally generated compounds), trace amounts of the test gas (e.g., <1% by vol), along with a supply of ethene (18.7% by vol) and hydrogen (51.3% by vol, balance He), were delivered to a heated metal catalyst.

Figure 2A:
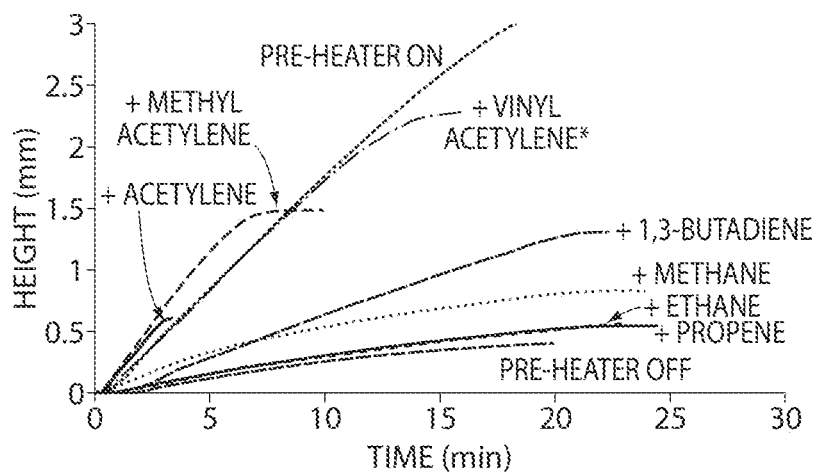
FIG. 2 shows various graphs illustrating the effects of chemical structure on VA-MWCNT growth, where each chemical structure is added to a mixture of unheated ethene/hydrogen/helium.
Figure 2B:
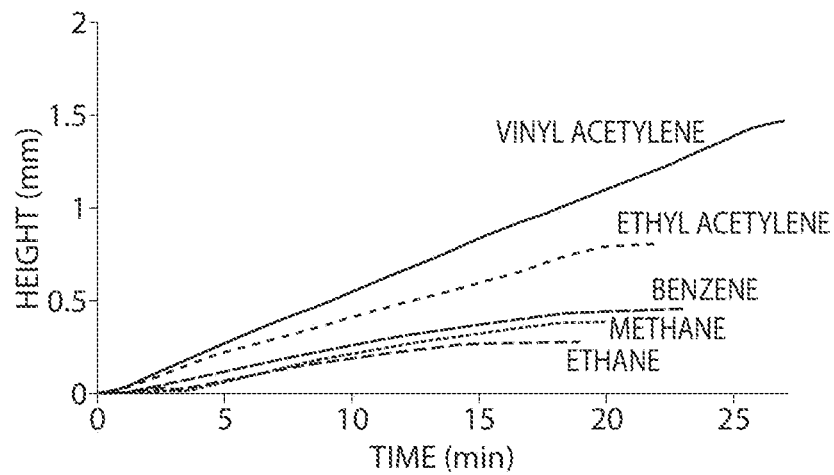
Figure 2C:
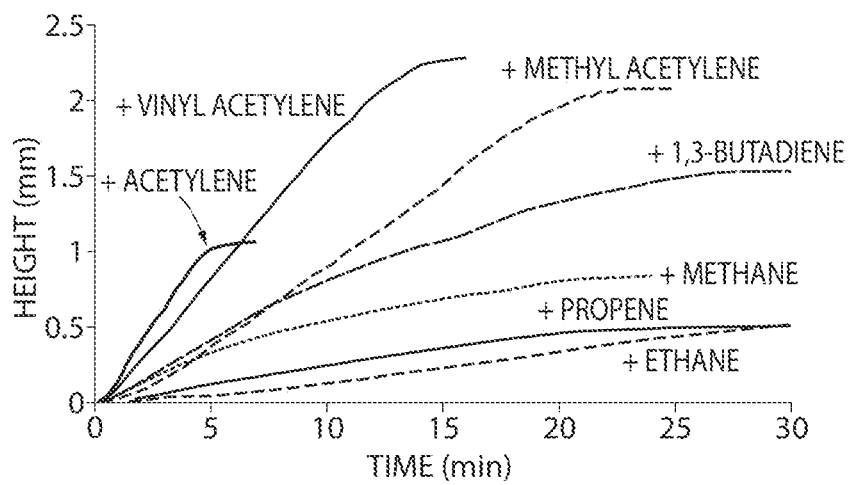

FIG. 2 shows various graphs illustrating the effects of chemical structure on VA-MWCNT growth. In all experiments, standard growth gasses ($C_2H_4/H_2=120/310$ sccm) were delivered without pre-heating in addition to either (1) no test gas ("pre-heater off") or (2) a test gas (e.g., methyl acetylene or methane). To provide a reference for typical growth conditions, a "pre-heater on" case (where only $C_2H_4$ and $H_2$ are delivered) is also shown. In FIG. 2A, test gases were delivered at equal partial pressures ($9.8\times10^{-3}$ atm), except for vinyl acetylene, which was more dilute ($3.0\times10^{-3}$ atm). All alkynes significantly accelerated growth compared to when they were not delivered (pre-heater off case). Test gases were then delivered at lower partial pressures ($3.3\times10^{-4}$ atm), as shown in FIG. 2B, or equal masses ($5.5\pm0.4$ ug C sccm$^{-1}$), as shown in FIG. 2C.

When equal partial pressures ($9.8\times10^{-3}$ atm) of each test gas were delivered, acetylene and methyl acetylene enhanced the growth rate of CNTs to a greater extent than either 1,3-butadiene or methane (FIG. 2A, growth rates of 4.1 μm s$^{-1}$ for both acetylene and methyl acetylene, and 2.9 μm s$^{-1}$ for pre-heater on). Notably, the mass spectral analysis showed no acetone in the cryogenically purified acetylene and thus, the rate enhancement could be attributed solely to the presence of acetylene. The addition of ethane, an abundant component of the thermal treatment of ethene, was not observed to accelerate CNT growth beyond that observed without any additional test gas (the "pre-heater off") case. A third alkyne was tested, but at a slightly lower partial pressure ($3.0\times10^{-3}$ atm), due to stability-derived concentration limitations on vinyl acetylene and our experimentally accessible flow rates. In spite of over a factor-of-3 dilution compared to acetylene and methyl acetylene, the CNT growth rate of vinyl acetylene was only 1.3 times slower (3.1 μm s$^{-1}$ vs. 4.1 μm s$^{-1}$) and still faster than the pre-heater on case (2.9 μm s$^{-1}$). Thus, if these concentrations are within the linear response range of vinyl acetylene's affect on growth (rather than some asymptotic response region as observed for methyl acetylene), then vinyl acetylene could be more active than both methyl acetylene and acetylene.

Additional activity of vinyl acetylene may arise from the double bond at the head of the molecule, and to probe the effect of this functional group, the accelerating effects of 1-butyne (which lacks a double bond) were studied. At the same partial pressures ($3.3\times10^{-4}$ atm), 1-butyne accelerated the growth of CNTs to a lesser extent than vinyl acetylene (FIG. 2B), suggesting that the alkene group may play a role in promoting CNT formation beyond the effects of the alkyne alone, as discussed more fully below.

Vinyl acetylene; which contains both a double and a triple bond, was observed to accelerate the growth of CNTs to a greater extent than did ethyl acetylene (or 1-butyne), which contains a triple bond, but lacks the double bond ((0.9 vs. 0.6 μm s$^{-1}$, respectively; FIG. 2B), indicating that the alkene group may play a role in promoting CNT formation beyond the effects of the alkyne alone. Even so, the presence of the alkyne functional group also affects CNT formation, as its absence can, in some cases, render the molecule an inefficient promoter of CNT formation. For example, 1,3-butadiene, which lacks a triple bond but contains alternating double bonds, was not observed to enhance CNT growth to the extent that vinyl acetylene does (1.1 vs. 3.1 um s$^{-1}$, respectively; FIG. 2A). It is noted that diacetylene (or 1,3-cutadiyne) was formed in cases in which accelerated growths was observed (see FIG. 3), and it may contribute to enhanced CNT formation.

For completeness, benzene, which was correlated to VA-MWCNT growth rate, was delivered to the catalyst as a test gas. There was limited acceleration in CNT formation at this low abundance of benzene (vapor pressure limits prevent the use of higher concentrations), but $3.3\times10^{-4}$ atm is within the range expected from thermal generation. Similarly, relevant concentrations of methane did not promote CNT formation rates. Thus, correlation with rate did not necessarily indicate that benzene or methane was acting to accelerate VA-MWCNT growth at the catalyst, as they may simply have been synthesized in sequence from another critical component (e.g., benzene formation methyl acetylene-derived radicals).

Previous studies have suggested that the perceived inactivity of methane could be due to its low carbon content (per mol gas) as compared to longer alkenes and alkynes. To ensure that the observed rate enhancements were not merely the result of differences in compound molecular mass, the delivery of each test precursor to a constant mass ($5.5\pm0.4$ ug C sccm$^{-1}$, where sccm is a standard cubic centimeter per minute) was normalized. In this example, on a mass basis, vinyl acetylene exhibited the greatest rate acceleration, followed by acetylene, methyl acetylene, 1,3-butadiene, and methane (FIG. 2C). Thus, the accelerating effects of alkynes on CNT growth can be attributed at least in part to the chemical structure (e.g., rather than simply to relative carbon contents).

Ultimately, rapid CNT growth can be achieved without heating feedstock gas, which will reduce energy requirements of industrial scale CVD synthesis and likely limit the formation of unintended by-products (e.g., toxics and greenhouse gases).

Example 4

The following example describes the collection and analysis of VOCs during the formation of carbon nanotubes, as described in Example 1. VOCs were collected and analyzed. Briefly, stainless steel canisters were placed downstream of the reactor tube and flushed for the duration of CNT growth. Gas samples were collected just after growth termination and sealed with stainless steel ball valves. Considering the flow rate of the gas and volume of the cylinder, these samples represented a 30-second integrated signal of VOCs forming during the reaction. Simultaneous measurements of VOC composition in the effluent gases were collected using an online mass spectrometer (MS, Pfeiffer OmniStar™) and monitoring relevant ions (m/z 2, 4, 12-18, 25-30, 32, 39-42, 44-45, 51-54, 65-66, 77-78, 91). These real-time analyses indicated that gas composition over a 30-second interval during the growth cycle was stable. VOCs in the stainless steel canisters were quantified by gas chromatography with a flame ionization detector and thermal conductivity detector (GD-FID-TCD with He reference gas) calibrated with standard gas mixtures. Gas samples were pre-focused using a cryogenic ($N_2$ (l)) trap of Porasil-C treated silica beads before injection on the HayeSep Q column. Detection limits were around 0.1 ppmv. He and $H_2$ were quantified using an additional GC-TCD with a $N_2$ reference gas.

Reduced By-Product Formation without Sacrificing CNT Growth.

Figure 3:
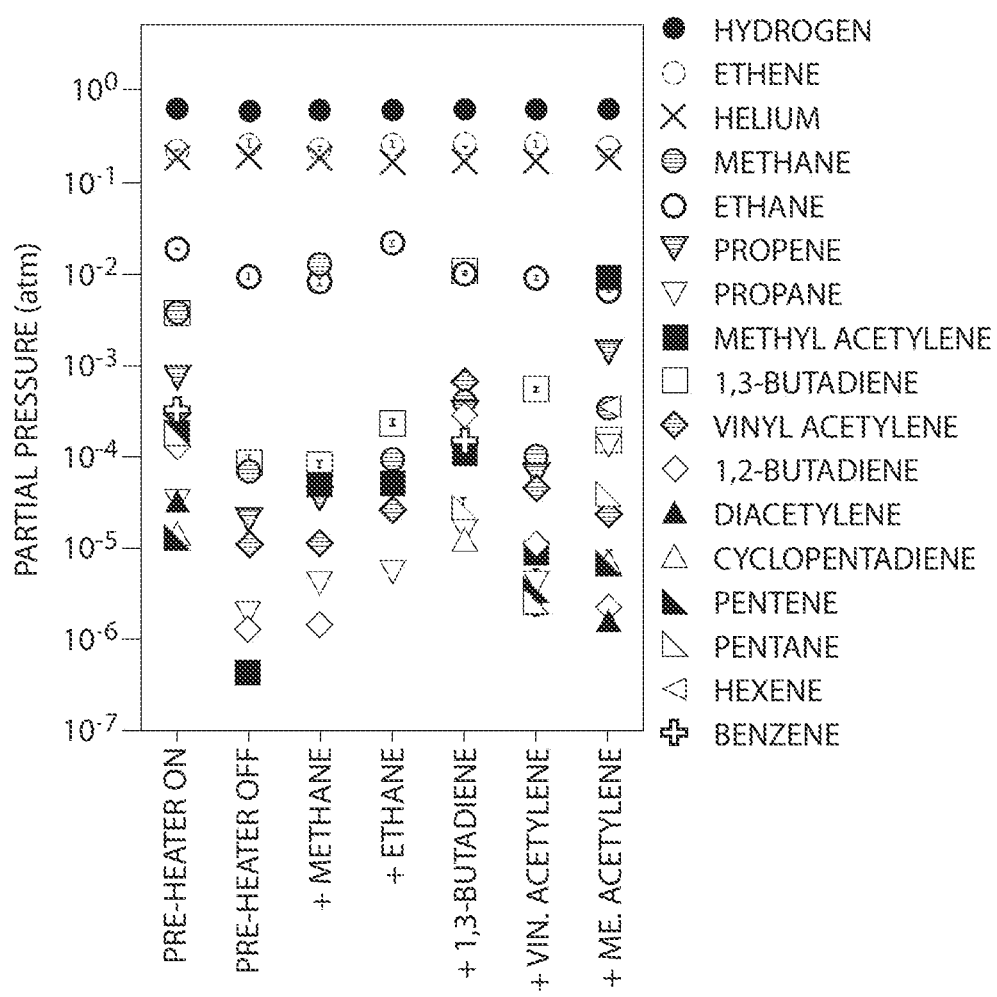
FIG. 3 shows a plot of the partial pressures of various reactants and byproducts, including volatile organic compounds (VOCs), during a nanostructure formation process.
Figure 4:
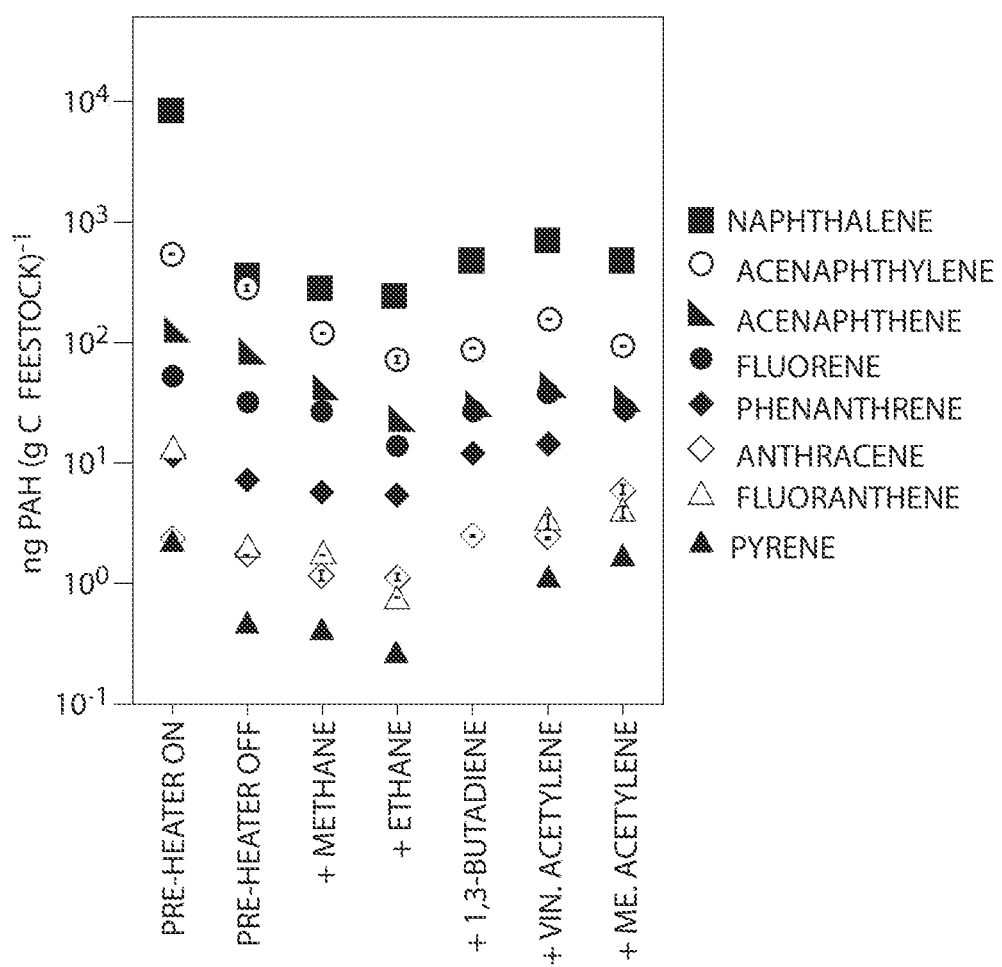
FIG. 4 shows a plot of the partial pressures of various reactants and byproducts, including polycyclic aromatic hydrocarbons (PAHs), during a nanostructure formation process.
Figure 5A:
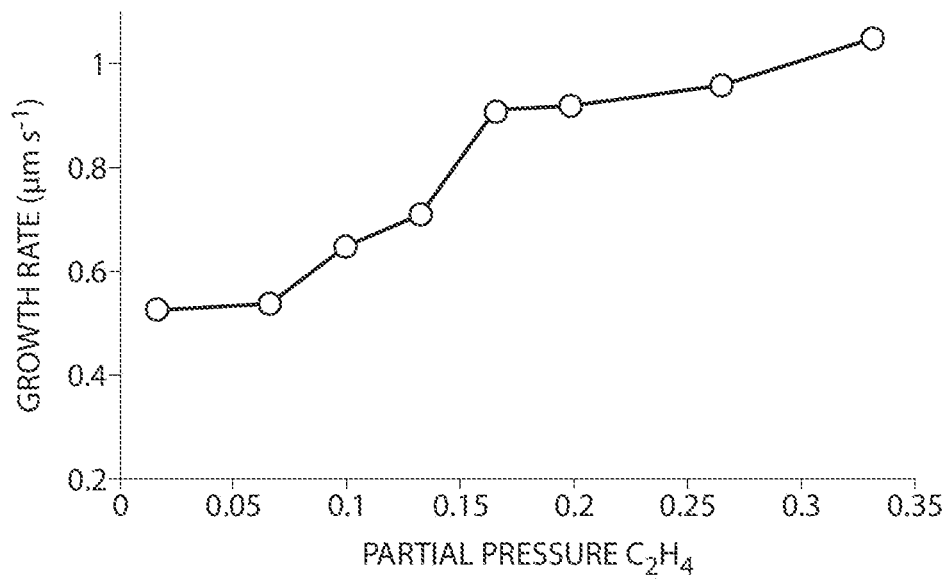
FIG. 5 shows plots of (a) nanostructure growth rate as a function of ethene (or ethylene) partial pressure, (b) catalyst lifetime as a function of ethylene partial pressure, (c) nanostructure growth rate as a function of hydrogen partial pressure, and (d) catalyst lifetime as a function of hydrogen partial pressure, during acetylene-assisted CNT growth.
Figure 5B:
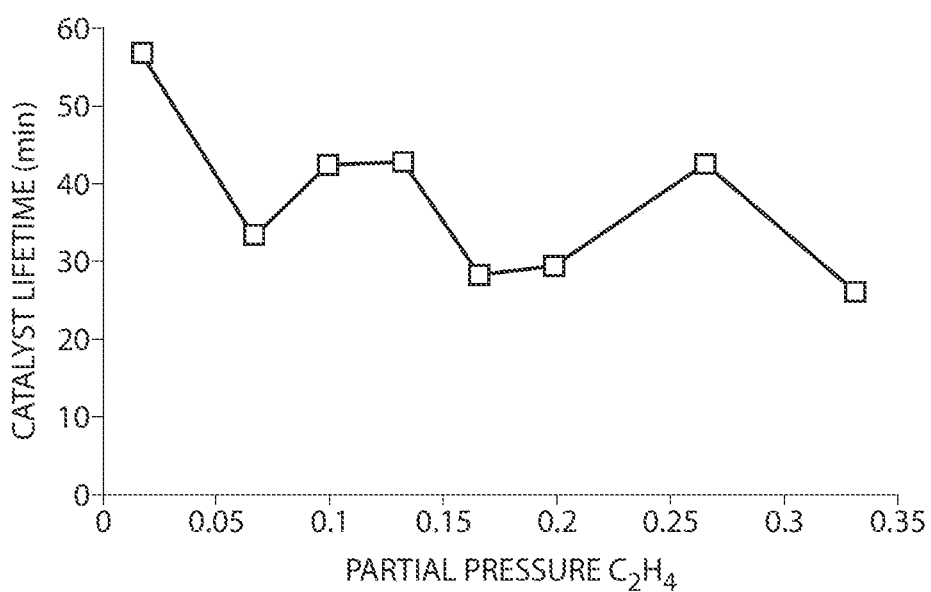
Figure 5C:
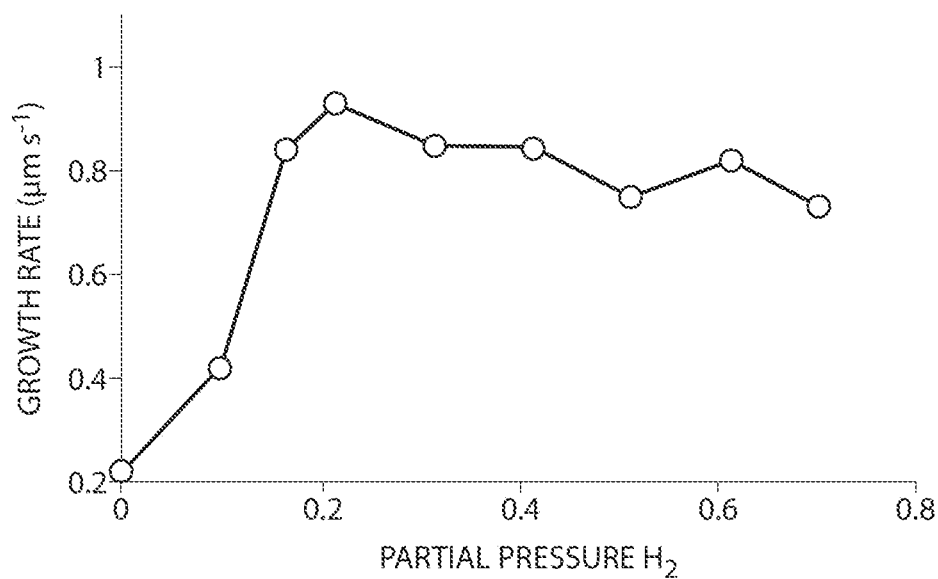
Figure 5D:
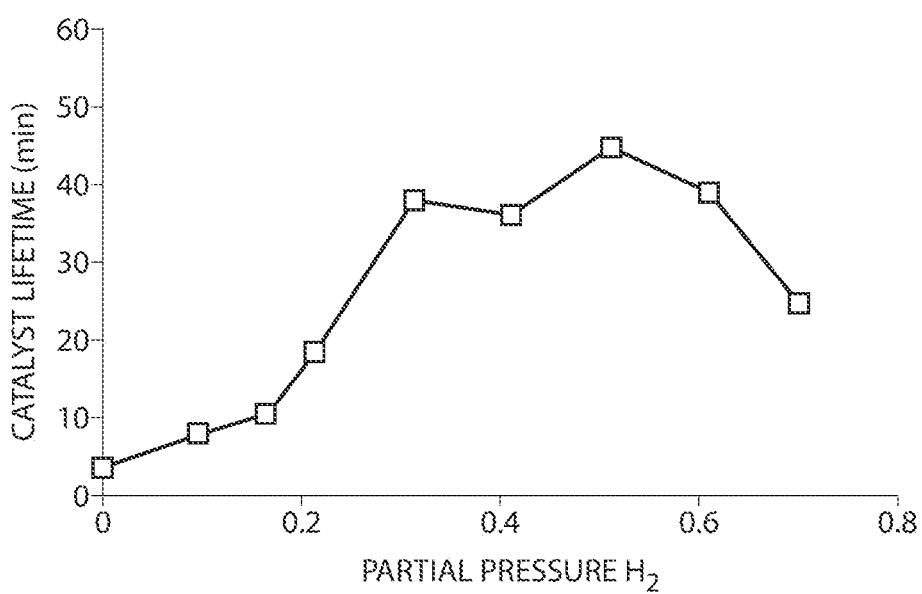

FIGS. 3-4 show plots of the partial pressures of various reactants and byproducts, including volatile organic compounds (VOCs), during a nanostructure formation process. ("Me acetylene" and "vin acetylene" are methyl acetylene and vinyl acetylene, respectively.) As shown in FIG. 3, eliminating thermal pre-treatment of feedstock gases reduced VOC formation. Labels shown on the abscissa indicate the identity of the test gas and correspond to the growth curves shown in FIG. 2A. In the "pre-heater on" and "pre-heater off" case, no test gas was added to the typical feedstock gas ($C_2H_4/H_2/He$=120/310/174 sccm). Error bars represent one standard deviation on multiple measurements and invisible error bars are smaller than the symbol. In FIG. 3, VOC concentrations are reported as partial pressure. In FIG. 4, PAH abundance was integrated throughout the CNT growth, and so concentrations are reported relative to total g C delivered.

Although feedstock gases were not heated prior to impingement on the metal catalyst, they were subject to local heating in the proximity of the resistively heated catalyst substrate platform. Thus, gas phase rearrangements in the reactor tube could result in the formation of unintended side products. In previous CVD approaches (e.g., with the pre-heater on), many volatile organic compounds are generated from the thermal treatment of ethene and hydrogen (FIG. 3), including methane (a potent greenhouse gas), benzene, and 1,3-butadiene (hazardous air pollutants regulated by the EPA). Omitting pre-heating can drastically reduce the abundance of all VOCs (except ethane) by more than an order of magnitude, as shown in Tables 1-2 and FIG. 3. Several compounds, including benzene, 1,3-butadiyne, cyclopentadiene, pentene, and pentane, were not even formed in appreciable quantities (>0.1 ppmv) when the pre-heater was off. Thus, CNT fabrication techniques that reduce energy delivered to (e.g., that limit the thermal treatment of) the feedstock gas offer substantial reductions in unnecessary emissions. Compared to pre-heating, methyl and vinyl acetylene-assisted growth reduced methane formation by about a factor of 30 and 1,3-butadiene formation 60 fold; benzene formation was effectively eliminated (below detection; <0.1 ppmv).

However, in some cases, where the pre-heating step is omitted, it may be advantageous to utilize an alkyne additive to achieve comparable CNT growth rates and heights. The addition of methyl acetylene and vinyl acetylene was observed to increase the VOC content of the effluent gas, but not above levels produced by thermal treatment of the feedstock. Compared to pre-heating, methane formation was reduced by about a factor of 30 during alkyne-assisted CNT growth; 1,3-butadiene formation was reduced by more than a factor of 60; and benzene formation was essentially eliminated. In this example, benzene was only formed when 1,3-butadiene was added to the unheated feedstock gases, and VOCs were relatively high when compared to other experiments without thermal treatment (e.g., pre-heating. The addition of either methane or ethane did not substantially increase the VOC load of the effluent, but it did augment the formation of methyl acetylene in gas phase reactions around the heated substrate (potentially due to the combination of methane radicals with ethene).

TABLE 1

VOC content of test gas reaction effluents.

| | Pre-heater on | | Pre-heater off | | +methane | | +ethane | |
|---|---|---|---|---|---|---|---|---|
| methane | 3.7(−3) | *1(−4)* | 6.7(−5) | *6(−6)* | 1.2(−2) | *1(−3)* | 9.1(−5) | *8(−6)* |
| ethane | 1.7(−2) | *1(−3)* | 8.8(−3) | *8(−4)* | 7.8(−3) | *3(−4)* | 2.1(−2) | *2(−3)* |
| propylene | 7.1(−4) | *2(−5)* | 2.0(−5) | *2(−6)* | 3.7(−5) | *2(−6)* | 4.8(−5) | *4(−6)* |
| propane | 3.2(−5) | *1(−6)* | 2.0(−6) | *8(−7)* | 3.9(−6) | *2(−7)* | 5.3(−6) | *4(−7)* |
| propyne | 1.7(−4) | *1(−5)* | 4.4(−7) | *5(−8)* | 4.8(−5) | *2(−6)* | 4.8(−5) | *4(−6)* |
| 1,3-butadiene | 3.6(−3) | *1(−4)* | 8.4(−5) | *8(−6)* | 7.9(−5) | *3(−6)* | 2.2(−4) | *2(−5)* |
| but-1-en-3-yne | 2.7(−4) | *1(−5)* | 1.1(−5) | *1(−6)* | 1.1(−5) | *1(−6)* | 2.5(−5) | *2(−6)* |
| 1,2-butadiene | 1.2(−4) | *1(−5)* | 1.3(−6) | *1(−7)* | 1.5(−6) | *1(−7)* | | |
| 1,3-butadiyne | 3.0(−5) | *1(−6)* | | | | | | |
| cyclo-pentadiene | 1.4(−5) | *1(−6)* | | | | | | |
| pentene | 1.2(−5) | *1(−6)* | | | | | | |
| pentane | 1.7(−4) | *1(−5)* | | | | | | |
| hexene | | | | | | | | |
| benzene | 3.1(−4) | *1(−5)* | | | | | | |

These entries correspond to the CNT growth rate curves that appear in FIG. 2a. The entries are partial pressures (atm) and within each column, the concentration is reported before its standard deviation (shown in italics). Values should be multiplied by 10 raised to the power given in the parentheses (e.g., 4.0(−4) = 4.0 × 10$^{-4}$ atm).

TABLE 2

VOC content of test gas reaction effluents (continued).

|  | +1,3-butadiene | | +but-1-en-3-yne | | +propyne | |
|---|---|---|---|---|---|---|
| methane | 4.0(−4) | *1(−5)* | 1.0(−4) | *1(−5)* | 3.3(−4) | *1(−5)* |
| ethane | 9.3(−3) | *1(−4)* | 8.5(−3) | *5(−4)* | 6.1(−3) | *1(−4)* |
| propylene | 2.8(−4) | *1(−5)* | 5.8(−5) | *4(−6)* | 1.3(−3) | *1(−4)* |
| propane | 1.5(−5) | *2(−6)* | 4.2(−6) | *1(−6)* | 1.3(−4) | *1(−5)* |
| propyne | 1.0(−4) | *1(−5)* | 8.9(−6) | *2(−6)* | 8.5(−3) | *1(−4)* |
| 1,3-butadiene | 1.0(−2) | *1(−3)* | 5.2(−4) | *3.3(−5)* | 1.5(−4) | *1(−5)* |
| but-1-en-3-yne | 6.4(−4) | *1(−5)* | 4.3(−5) | *3(−6)* | 2.2(−5) | *1(−6)* |
| 1,2-butadiene | 2.8(−4) | *4(−5)* | 1.1(−5) | *1(−6)* | 2.2(−6) | *1(−7)* |
| 1,3-butadiyne | | | 2.4(−6) | *4(−7)* | 1.5(−6) | *1(−7)* |
| cyclopentadiene | 1.2(−5) | *1(−6)* | | | 7.0(−6) | *2(−6)* |
| pentene | | | 3.2(−6) | *4(−7)* | 6.5(−6) | *1(−7)* |
| pentane | | | 2.5(−6) | *1(−7)* | 3.7(−5) | *1(−6)* |
| hexene | | | | | 3.5(−4) | *1(−5)* |
| benzene | 1.0(−4) | *5(−5)* | | | | |

These entries correspond to the CNT growth rate curves that appear in FIG. 2a. The entries are partial pressures (atm) and within each column, the concentration is reported before its standard deviation (shown in italics). Values should be multiplied by 10 raised to the power given in the parentheses (e.g., 4.0(−4) = 4.0 × 10$^{-4}$ atm).

Example 5

The following example describes the collection and analysis of PAHs during the formation of carbon nanotubes, as described herein. PAHs were collected and analyzed. Briefly, PAHs were concentrated on two consecutive, pre-cleaned polyurethane foam (PUF) filters (3" length×1" diameter). These filters were in place for the entire duration of CNT growth, and the reported PAH abundances represent an integrated signal throughout the growth period. PUFs were extracted by triplicate accelerated solvent extractions (ASE) with a 90:10 dichloromethane:methanol mixture at 100° C. and 1000 psi for 5 min. Each extract was concentrated by rotary evaporation, and analyzed by GC-MS. Sample recovery was assessed using internal standards ($d_{10}$-acenaphthalene, m-terphenyl, and $d_{12}$-perylene) and ranged from 75±1% for low molecular weight PAHs (128 to 154 amu) to greater than 90±1% for higher molecular weight PAHs (>166 amu). Detection limits were around 1 ng $g_{C\,feedstock}^{-1}$ (an average of 0.001 parts per trillion by volume).

Several toxic PAHs were formed and emitted during carbon nanotube formation. Eliminating thermal treatment of the feedstock gases reduced the total PAH load by an order of magnitude, as shown in Tables 3-4. Naphthalene, fluoranthene, and pyrene were most sensitive to changes in thermal pre-treatment, reduced by factors of 20, 60, and 40, respectively. The acenaphthylene, acenaphthene, fluorene, phenanthrene, and anthracene contents of the effluent were only slightly reduced by foregoing thermal pre-treatment. Interestingly, adding ethane resulted in a measurable reduction in fluoranthene and pyrene, and 1,3-butadiene-assisted CNT growth did not yield measurable fluoroanthene or pyrene. In contrast, fluoranthene and pyrene were elevated in alkyne-assisted CNT syntheses relative to unassisted growths. Without wishing to be bound by theory, studies have postulated that fluoranthene, whose structure resembles a CNT cap, is responsible for CNT nucleation. The increased abundance of these four-ringed PAHs in enhanced syntheses, and their reduced presence in reactions that showed no enhancement, may indicate their potential role in CNT formation.

The total PAH content of alkyne-assisted CNT syntheses was elevated relative to unassisted growths, but was reduced by over an order of magnitude compared to traditional thermal pre-treatment techniques. Thus, the potential environmental impact of CNT manufacture can be markedly reduced without sacrificing CNT growth rate. In some cases, selective delivery of important CNT precursor molecules can afford greater control over the reaction, as thermally generated compounds that interfere with product quality can be minimized or even avoided. For example, PAHs may contribute to the formation of amorphous carbon, a significant, interfering, and difficult to remove co-product generated in many CNT-forming processes. The reduced PAH content of alkyne-assisted syntheses described herein may yield high purity CNTs with limited amorphous carbon coatings.

TABLE 3

PAH content of test gas reaction effluents.

|  | Pre-heater on | | Pre-heater off | | +methane | | +ethane | |
|---|---|---|---|---|---|---|---|---|
| naphthalene | 8.3(3) | *8(2)* | 3.6(2) | *3(1)* | 2.8(2) | *2(1)* | 2.4(2) | *3(1)* |
| acenaphthylene | 5.4(2) | *1(1)* | 2.9(2) | *1(1)* | 1.2(2) | *1(1)* | 7.0(1) | *3* |
| acenaphthene | 1.2(2) | *1(1)* | 8.2(1) | *5* | 4.1(1) | *1* | 2.2(1) | *1* |
| fluorene | 5.2(1) | *2* | 3.2(1) | *1* | 2.7(1) | *1* | 1.3(1) | *1* |
| phenanthrene | 1.1(1) | *2(−1)* | 7.0 | *1* | 5.5 | *3(−1)* | 5.2 | *1(−1)* |
| anthracene | 2.2 | *1(−1)* | 1.7 | *1(−1)* | 1.1 | *1(−1)* | 1.1 | *1(−1)* |
| fluoranthene | 1.2(1) | *4(−1)* | 2.0 | *1(−1)* | 1.7 | *1(−1)* | 7.4(−1) | *1(−2)* |
| pyrene | 2.2 | *1(−1)* | 4.5(−1) | *5(−2)* | 4.0(−1) | *3(−2)* | 2.6(−1) | *1(−2)* |

TABLE 3-continued

PAH content of test gas reaction effluents.

|  | Pre-heater on | | Pre-heater off | | +methane | | +ethane | |
|---|---|---|---|---|---|---|---|---|
| $\Sigma_{PAH}$ | 9.1(3) | 8(2) | 7.7(2) | 3(1) | 4.7(2) | 2(1) | 3.6(2) | 3(1) |
| gC per synthesis | | 2.1 | | 2.3 | | 2.5 | | 2.7 |

These entries correspond to the CNT growth rate curves that appear in FIG. 2a. The entries are mass PAH per mass C feedstock (ng g$^{-1}$) and within each column, the concentration is reported before its standard deviation (shown in italics). Values should be multiplied by 10 raised to the power given in the parentheses (e.g., 8.3(3) = 8.3 × 10$^3$ ng PAH g C feedstock$^{-1}$).

TABLE 4

PAH content of test gas reaction effluents (continued).

|  | +1,3-butadiene | | +but-1-en-3-yne | | +propyne | |
|---|---|---|---|---|---|---|
| naphthalene | 4.6(2) | 6(1) | 7.2(2) | 1(1) | 4.7(2) | 5(1) |
| acenaphthylene | 9.0(1) | 5(−1) | 1.6(2) | 1(1) | 9.4(1) | 1 |
| acenaphthene | 3.1(1) | 2 | 4.4(1) | 2 | 3.3(1) | 3 |
| fluorene | 2.6(1) | 1 | 3.8(1) | 1 | 2.7(1) | 1 |
| phenanthrene | 1.2(1) | 6 | 1.4(1) | 1 | 2.7(1) | 1 |
| anthracene | 2.4 | 3(−1) | 2.3 | 1(−1) | 5.8 | 2(−1) |
| fluoranthene | | | 3.4 | 3(−1) | 3.9 | 3(−1) |
| pyrene | | | 1.1 | 2(−1) | 1.7 | 1(−1) |
| $\Sigma_{PAH}$ | 6.2(2) | 6(1) | 9.8(2) | 1(1) | 6.6(2) | 5(1) |
| gC per synthesis | | 1.7 | | 2.4 | | 0.9 |

These entries correspond to the CNT growth rate curves that appear in FIG. 2a. The entries are mass PAH per mass C feedstock (ng g$^{-1}$) and within each column, the concentration is reported before its standard deviation (shown in italics). Values should be multiplied by 10 raised to the power given in the parentheses (e.g., 8.3(3) = 8.3 × 10$^3$ ng PAH g C feedstock$^{-1}$).

Example 6

Figure 9:
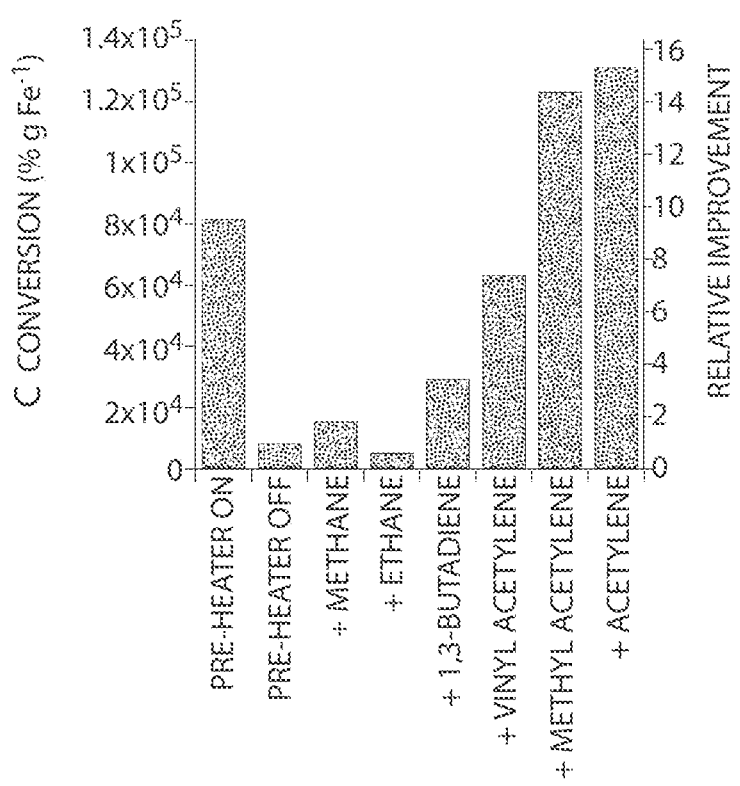
FIG. 9 shows a graph of carbon conversion yield for various reaction conditions in the CVD reactor.

The following example describes how increased carbon conversion can lead to high-purity CNTs. The graph in FIG. 9 illustrates how alkyne-assisted CVD can offer improved carbon conversion yields and catalyst efficiencies. Carbon conversion was normalized to the mass of catalyst used ((g CNT per g C precursor)×100%)/g catalyst). The catalyst was deposited by electron-beam evaporation at an estimated density of 7.9 ng Fe mm$^{-2}$. As shown in FIG. 9, augmenting growth with trace amounts of alkynes offered substantial improvements in carbon conversion efficiency (g CNT per g C feedstock×100%, normalized to catalyst mass). Acetylene- or methyl acetylene-assisted growth improved C conversion by factors of 14 and 15 (1.2×10$^5$ and 1.3×10$^5$% g catalyst$^{-1}$), respectively, exceeding the efficiencies that were achieved with thermal treatment approaches (8.2×10$^4$% g catalyst$^{-1}$). In addition, dosing unheated feedstock with trace quantities of vinyl acetylene growth offered a 7.5-fold improvement in C conversion (6.4×10$^4$% g catalyst$^{-1}$). In contrast, methane, ethane, and 1,3-butadiene showed relatively small enhancement in CNT formation beyond what is achieved without pre-heating.

CNT yields have also been reported in terms of "catalyst efficiency" (g CNT per g catalyst), which does not account for carbon precursor mass. In this example, without the use of oxidative etchants or thermal treatments, catalyst efficiencies up to 1.1×10$^3$ were observed.

Also, CNT purity (% CNT) was maintained in spite of eliminating thermal treatment of the feedstock. FIG. 10 shows a graph illustrating how product purity was maintained during alkyne-assisted CVD. Purity was determined by thermal gravimetric analysis (TGA; reported as % CNT) and Raman spectroscopy (reported as G/D ratio). Samples analyzed here correspond to those grown at the same test gas partial pressures (i.e., FIG. 1D). In the "pre-heater on" and "pre-heater off" case, no test gas was added to the typical feedstock gas ($C_2H_4$/$H_2$/He=120/310/174 sccm). Error bars represent the uncertainty of the TGA curve fit and one standard deviation on triplicate Raman measurements. Large TGA error bars resulted from the relatively small total mass generated during some experiments, as a result of inefficient precursors (i.e., pre-heater off, +methane, +ethane, and +1,3-butadiene) or short catalyst lifetime (i.e., +acetylene).

Vinyl acetylene-, methyl acetylene-, and acetylene-assisted growths produced materials with CNT purities of 86±2%, 84±3%, and 91±7%, respectively, none of which are significantly different from the CNT product generated by feedstock heating, as shown in FIG. 10. (87±1%; results determined by thermal gravimetric analysis; FIG. 10).

Example 7

In the following example, optimization of the reactant vapor or feedstock is studied, including minimizing the use of ethene and hydrogen.

While a relatively small concentration of alkyne added to the unheated ethene feedstock accelerated CNT growth, the mass of alkyne was not sufficient to account for the mass of CNT formed, and additional compounds must have added to the growing CNT lattice. The principle feedstock, ethylene, may serve as a co-reactant at the metal catalyst to form CNTs. If so, a reduction in the rate of CNT formation as $C_2H_4$ abundance is reduced may be expected. As noted above, transition-metal catalyzed cyclization reactions often rely on both an alkyne and an alkene to form new carbon-carbon bonds, ultimately forming unsaturated rings with carbon backbones. In these reactions, the metal is reduced in order to have catalytic activity, and the electrons are necessary to promote bond formation. In CNT synthesis, most catalysts are reduced (usually with $H_2$) prior to CNT growth (except for, most notably, Fe(CO)$_5$, which is used in HiPCO® syntheses). If the catalyst continually transfers electrons to carbonaceous reactants to form long CNTs, $H_2$ (an electron donor) may be required for sustained catalytic activity. However, hydrogen's influence may not strictly be limited to catalytic effects, as it is also important to gas-phase reactions during CNT synthesis. To explore the role of $H_2$ and $C_2H_4$ in an alkyne-assisted CNT synthesis, the concentration of $H_2$ and $C_2H_4$ was varied independently while fixing acetylene (the cheapest of the tested alkynes). Furthermore, studies were conducted to identify the minimal $H_2$ and $C_2H_4$ quantities necessary to obtain rapid, sufficient CNT formation, so as to minimize initial feedstock costs and minimize waste.

FIG. 5 shows plots of nanostructure growth rate as a function of ethene (i.e., ethylene) partial pressure, illustrating the effects of ethene and hydrogen on nanotube growth rate and catalyst lifetime during acetylene-assisted CNT growth.

Acetone-free acetylene was delivered at $1.0\times10^{-3}$ atm in all experiments; when $C_2H_4$ was varied, $H_2$ was constant 0.51 atm; when $H_2$ was varied, $C_2H_4$ was constant at 0.20 atm; helium was used to maintain a constant total flow rate of 604 sccm. As $C_2H_4$ abundance was reduced, a sharp decrease in CNT growth rate was observed. (FIG. 5A) This is consistent with ethene having a co-catalytic role with the alkyne in the CNT formation reaction. In contrast, the abundance of $C_2H_4$ delivered as feedstock gas did not have a clear relationship with the catalyst lifetime. (FIG. 5B) Unless $C_2H_4$ concentration promotes significant soot formation over the catalyst, there may be no a priori reason to expect that $C_2H_4$ levels would influence the duration of growth. Thus, the initial feedstock concentration of ethene can be reduced by, for example, 20%, without sacrificing CNT growth rate or yield.

The partial pressure of $H_2$ ($pH_2$) had a significant impact on the catalyst lifetime. (FIG. 5D) At low $pH_2$ (<0.31 atm), there was a sharp decrease in the catalyst lifetime, consistent with hydrogen's role as a sustained source of electrons necessary to re-reduce the catalyst after it has been oxidized (presumably by donating electrons for metal-carbon or carbon-carbon bond formation). If $H_2$ were acting as a reductant, the resultant oxidized product would be $H^+$ ion. The reaction would be promoted if there were some repository for this ion, and water formed via the initial reduction of $Fe_2O_3$ by $H_2$ or as a trace component in feedstock gases, could serve as such a receptor. Indeed, recent studies have shown that water and other oxygen-containing molecules can prolong CNT growth, but the mechanism for this enhancement has not been established. While a minimum amount of hydrogen was needed to sustain catalyst activity, excess $pH_2$ reduced the catalyst lifetime. In polyethylene (polyethene) polymerization reactions, an abrupt increase in $pH_2$ can terminate chain propagation by adding to the metal catalyst, blocking monomer addition, and it is often used to control the ultimate length of the polymer. If the CNT formation reaction has analogous polymerization character, high $pH_2$ would be expected to induce a termination event, as observed. Alternatively, termination events could be induced by via protonation by water to yield a reductive coupling product (e.g., adding H to the CNT and cleaving the metal-CNT bond), and recent observations of water-induced cleavage of CNT-catalyst contact support this mechanism for termination.

In addition to having a substantial influence on catalyst lifetime, low $pH_2$ (<0.17 atm) affected CNT growth rate. (FIG. 5A) Without wishing to be bound by theory, two potential explanations for this (that rely on either gas-phase or catalyst-based reactions) include: (1) in the gas phase, inadequate hydrogen can limit the formation of VOCs (possibly denying the catalyst of a necessary precursor) and also promote polyacetylene formation (which may disfavor structures with long-range order), and (2) at the catalyst, excess hydrocarbon-derived hydrogen must be removed from the growing CNT backbone, and $H_2$-derived H radicals could abstract these, leaving a conjugated π-system in place.

$H_2$ serves a multi-faceted role in the CNT formation reaction. Without compromising CNT growth rate or catalyst lifetime, the amount of input hydrogen can be reduced from 0.51 to 0.31 atm, a 40% reduction that will translate to cost savings for the manufacturer. As noted above, a 20% reduction in ethene input may be possible (with $pH_2$=0.51), and there are evident opportunities to reduce both initial feedstock costs and the total amount of carbonaceous material being vented to the atmosphere. Furthermore, eliminating the thermal treatment of feedstock gases by supplying the necessary precursors directly to the metal catalyst reduces the formation of potentially harmful and unintended by-products, can reduce energetic costs associated with synthesis, and can limit unnecessary damage to the environment without sacrificing production quality.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A method for forming carbon nanostructures, comprising:
   heating a reactant vapor comprising a nanostructure precursor material to a temperature between 700° C. and 1200° C.;
   after the heating step, cooling the reactant vapor to a temperature of less than 400° C.;
   after the cooling step, contacting the reactant vapor at the temperature of less than 400° C. with a catalyst material to cause formation of nanostructures,
   wherein the nanostructure precursor material comprises an alkyne and an alkene.

2. A method as in claim 1, wherein the alkyne is ethyne, propyne, but-1-en-3-yne, or 1,3-butadiyne.

3. A method as in claim 1, wherein the reactant vapor comprises ethylene, hydrogen, and an alkyne.

4. A method as in claim 1, wherein the reactant vapor comprises, by volume, 35% or less ethylene, 70% or less hydrogen, and 0.1% or less alkyne, such that the total amount of ethylene, hydrogen, and alkyne equals 100%.

5. A method as in claim 1, wherein the reactant vapor comprises, by volume, 16% to 35% ethylene.

6. A method as in claim 1, wherein the reactant vapor comprises, by volume, 16% to 70% hydrogen.

7. A method as in claim 1, wherein the reactant vapor further comprises helium.

8. A method as in claim 1, wherein the reactant vapor further comprises argon.

9. A method as in claim 1, wherein the reactant vapor comprises, by volume, 20% ethylene, 51% hydrogen, and 29% helium.

10. A method as in claim 1, wherein the reactant gas is substantially free of an oxygen-containing species, provided that the oxygen-containing species is not water.

11. A method as in claim 1, wherein the act of contacting causes formation of a product vapor comprising at least one carbon-containing byproduct.

12. A method as in claim 1, wherein the reactant vapor is maintained at a temperature of less than 300° C. prior to contacting the catalyst material.

13. A method as in claim 1, wherein the reactant vapor is maintained at a temperature of less than 200° C. prior to contacting the catalyst material.

14. A method as in claim 1, wherein the reactant vapor is maintained at a temperature of less than 100° C. prior to contacting the catalyst material.

15. A method as in claim 1, wherein the reactant vapor is maintained at a temperature of less than 75° C. prior to contacting the catalyst material.

16. A method as in claim 1, wherein the reactant vapor is maintained at a temperature of less than 50° C. prior to contacting the catalyst material.

17. A method as in claim 1, wherein the reactant vapor is maintained at a temperature of less than 30° C. prior to contacting the catalyst material.

18. A method as in claim 1, wherein the reactant vapor is maintained at a temperature of less than 25° C. prior to contacting the catalyst material.

19. A method as in claim 1, further comprising:
   pre-heating, prior to the act of introducing, the reactant vapor to a temperature of at least 700° C.; and
   cooling the reactant vapor prior to contacting the catalyst material.

20. A method as in claim 1, further comprising:
   pre-heating, prior to the act of introducing, the reactant vapor to a temperature of at least 900° C.; and
   cooling the reactant vapor prior to contacting the catalyst material.

21. A method as in claim 1, further comprising:
   pre-heating, prior to the act of introducing, the reactant vapor to a temperature of at least 1100° C.; and
   cooling the reactant vapor prior to contacting the catalyst material.

22. A method as in claim 1, wherein the nanostructures are formed on a surface of the catalyst material.

23. A method as in claim 1, wherein the nanostructures are nanotubes.

24. A method as in claim 23, wherein the nanostructures are single-walled carbon nanotubes or multi-walled carbon nanotubes.

25. A method as in claim 23, wherein the nanostructures are vertically aligned multi-walled carbon nanotubes.

26. A method as in claim 1, wherein the nanostructures are arranged on or in a surface of the catalyst material, such that the long axes of the nanostructures are substantially aligned and non-parallel to the surface.

27. A method as in claim 1, wherein the nanostructures are arranged on or in a surface of the catalyst material, such that the long axes of the nanostructures are substantially parallel to the surface.

28. A method as in claim 1, wherein the catalyst material comprises a metal or metal oxide.

29. A method as in claim 28, wherein the catalyst material comprises iron.

30. A method as in claim 11, wherein the at least one carbon-containing byproduct is a volatile organic compound (VOC) or a polycyclic aromatic hydrocarbon (PAH).

31. A method as in claim 30, wherein the volatile organic compound is methane, ethane, propane, propene, 1,2-butadiene, 1,3-butadiene, 1,3-butadiyne, pentane, pentene, cyclopentadiene, hexene, or benzene.

32. A method as in claim 30, wherein the volatile organic compound is methane, 1,3-butadiene, or benzene.

33. A method as in claim 30, wherein the polycyclic aromatic hydrocarbon is naphthalene, acenaphthalene, fluorene, phenanthrene, anthracene, fluoranthene, pyrene, chrysene, coronene, triphenylene, naphthacene, phenanthrelene, picene, fluorene, perylene, or benzopyrene.

34. A method as in claim 11, wherein the product vapor comprises one or more volatile organic compounds in an amount less than 10% of the total volume of product vapor that exits the reaction chamber during formation of the nanostructure, wherein the volatile organic compound is not ethylene.

35. A method as in claim 11, wherein the product vapor comprises one or more volatile organic compounds in an amount less than 5% of the total volume of product vapor that exits the reaction chamber during formation of the nanostructure, wherein the volatile organic compound is not ethylene.

36. A method as in claim 11, wherein the product vapor comprises one or more volatile organic compounds in an amount less than 3% of the total volume of product vapor that exits the reaction chamber during formation of the nanostructure, wherein the volatile organic compound is not ethylene.

37. A method as in claim 11, wherein the product vapor comprises one or more volatile organic compounds in an amount less than 2.6% of the total volume of product vapor that exits the reaction chamber during formation of the nanostructure, wherein the volatile organic compound is not ethylene.

38. A method as in claim 11, wherein the product vapor comprises one or more volatile organic compounds in an amount less than 2.0% of the total volume of product vapor that exits the reaction chamber during formation of the nanostructure, wherein the volatile organic compound is not ethylene.

39. A method as in claim 11, wherein the product vapor comprises one or more volatile organic compounds in an amount less than 1.5% of the total volume of product vapor that exits the reaction chamber during formation of the nanostructure, wherein the volatile organic compound is not ethylene.

40. A method as in claim 11, wherein the product vapor comprises one or more volatile organic compounds in an amount less than 1.0% of the total volume of product vapor that exits the reaction chamber during formation of the nanostructure, wherein the volatile organic compound is not ethylene.

41. A method as in claim 11, wherein the product vapor comprises one or more volatile organic compounds in an amount less than 0.9% of the total volume of product vapor that exits the reaction chamber during formation of the nanostructure, wherein the volatile organic compound is not ethylene.

42. A method as in claim 11, wherein the product vapor comprises methane in an amount less than 0.4% of the total volume of product vapor that exits the reaction chamber during formation of the nanostructure, and wherein methane is substantially not present in the reactant vapor.

43. A method as in claim 11, wherein the product vapor comprises 1,3-butadiene in an amount less than 0.4% of the total volume of product vapor that exits the reaction chamber during formation of the nanostructure, and wherein 1,3-butadiene is substantially not present in the reactant vapor.

44. A method as in claim 11, wherein the product vapor comprises benzene in an amount less than 0.3% of the total volume of product vapor that exits the reaction chamber during formation of the nanostructure, and wherein benzene is substantially not present in the reactant vapor.

45. A method for forming carbon nanostructures, comprising:
  contacting a reactant vapor comprising, by volume, 20% ethylene, 51% hydrogen, and 29% helium, with a catalyst material to cause formation of nanostructures,
  wherein the reactant vapor is maintained at a temperature of less than about 400° C.

* * * * *